US008719049B2

(12) United States Patent
Samar et al.

(10) Patent No.: US 8,719,049 B2
(45) Date of Patent: May 6, 2014

(54) AUTOMATED METHOD OF REPORTING PAYMENTS MADE TO PATIENTS FOR THEIR PARTICIPATION IN A CLINICAL STUDY IN A BLINDED MANNER TO THE SPONSOR OF THE CLINICAL STUDY

(75) Inventors: John P. Samar, Wayne, PA (US); Samuel J. Whitaker, Phoenixville, PA (US)

(73) Assignee: Greenphire LLC, King of Prussia, PA (US)

(*) Notice: Subject to any disclaimer, the term of this patent is extended or adjusted under 35 U.S.C. 154(b) by 97 days.

(21) Appl. No.: 13/170,899

(22) Filed: Jun. 28, 2011

(65) Prior Publication Data

US 2012/0004926 A1 Jan. 5, 2012

Related U.S. Application Data

(60) Provisional application No. 61/360,219, filed on Jun. 30, 2010.

(51) Int. Cl.
*G06Q 50/00* (2012.01)

(52) U.S. Cl.
USPC ...................... 705/2; 705/3; 707/622; 726/28

(58) Field of Classification Search
USPC ........................ 705/2, 3; 707/622, 19; 726/28
See application file for complete search history.

(56) References Cited

U.S. PATENT DOCUMENTS

| | | | | |
|---|---|---|---|---|
| 6,556,999 | B1 * | 4/2003 | Kloos et al. | 1/1 |
| 6,732,113 | B1 * | 5/2004 | Ober et al. | 1/1 |
| 7,089,247 | B2 * | 8/2006 | Kloos et al. | 1/1 |
| 7,742,933 | B1 * | 6/2010 | Royds | 705/3 |
| 8,358,754 | B2 * | 1/2013 | Uy et al. | 726/28 |
| 8,448,258 | B2 * | 5/2013 | Abuelsaad et al. | 726/28 |
| 2004/0143403 | A1 * | 7/2004 | Brandon et al. | 702/19 |
| 2008/0270181 | A1 * | 10/2008 | Rosenberg | 705/2 |
| 2010/0138235 | A1 * | 6/2010 | Marks et al. | 705/2 |
| 2010/0228699 | A1 * | 9/2010 | Webber et al. | 707/622 |
| 2011/0047628 | A1 * | 2/2011 | Viars | 726/28 |

FOREIGN PATENT DOCUMENTS

WO WO 2011103523 A1 * 8/2011

* cited by examiner

*Primary Examiner* — Lena Najarian
*Assistant Examiner* — Teresa Woods
(74) *Attorney, Agent, or Firm* — Panitch Schwarze Belisario & Nadel LLP

(57) ABSTRACT

An automated method and computer program product are provided for reporting payments made to patients for their participation in a clinical study in a blinded manner to the sponsor of the clinical study. The clinical study has a plurality of investigative sites which perform activities in accordance with the protocol of the clinical study. Each patient has patient ID information and is assigned a subject ID that de-identifies the patient. Payment requests are received at a software application from the investigative sites associated with patient activity. The software application includes for each patient that is participating in the clinical study, the patient ID information, and the de-identified subject ID. The payment requests are associated with the patient ID information. The payment requests are processed at the software application, and payments that conform to predefined compensation guidelines for the clinical study are approved. The software application generates blinded payment reports for electronic delivery to the sponsor. The payment reports show at least the de-identified subject ID for each approved payment, the payment amounts for each approved payment, and a date associated with the payment.

12 Claims, 42 Drawing Sheets

Travel Approval for Carl Higgens

| Request Date | Subject | Estimated Total Travel Expense |
|---|---|---|
| 06/24/2010 | Carl Higgens | $0.00 |

- Car Service
- Hotel
- Stipend
- Flight
- Parking

Add Parking

Airport Amount: 25.00
Hotel Amount: 16.00
Site Amount: 15.00
Other Amount:
Comments / Notes: * Parking reimbursement is being provided for Airport, Hotel and Site parking lots Submit  Cancel

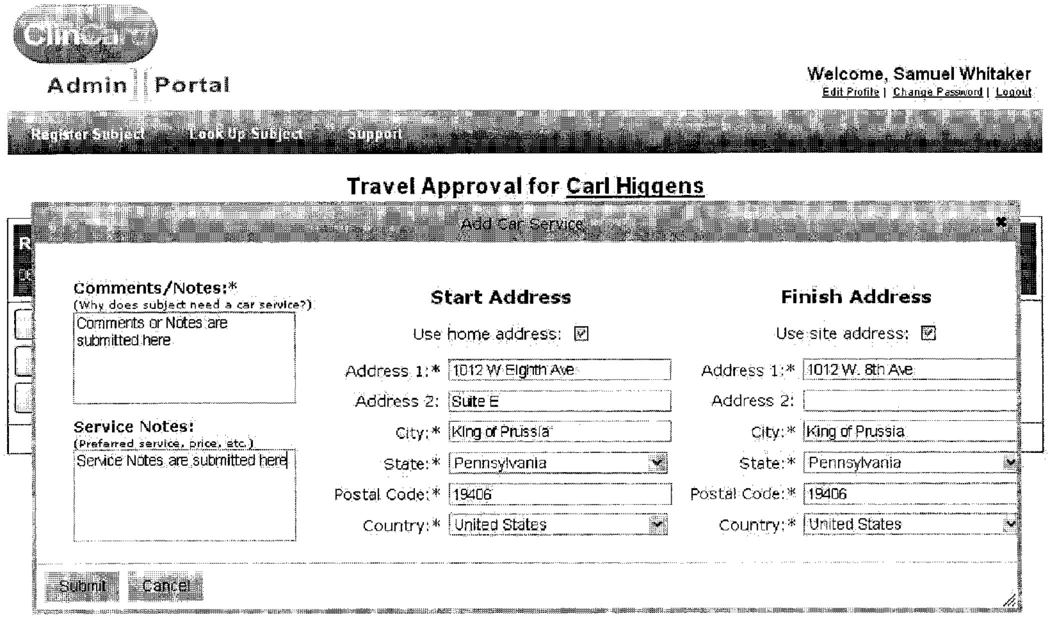

FIGURE 28

Admin Portal

Welcome, Samuel Whitaker
Edit Profile | Change Password | Logout

Register Subject | Look Up Subject | Support

Travel Approval for Carl Higgens

Add Car Service

Comments/Notes:* 
(Why does subject need a car service?)
Comments or Notes are submitted here

Service Notes:
(Preferred service, price, etc.)
Service Notes are submitted here

Start Address

Use home address: ☑
- Address 1:* 1012 W Eighth Ave
- Address 2: Suite E
- City:* King of Prussia
- State:* Pennsylvania
- Postal Code:* 19406
- Country:* United States

Finish Address

Use site address: ☑
- Address 1:* 1012 W. 8th Ave
- Address 2:
- City:* King of Prussia
- State:* Pennsylvania
- Postal Code:* 19406
- Country:* United States Submit  Cancel Admin Portal Welcome,
Edit Profile | Change Password | Logout Subject ID →

| ACTIONS | ESTIMATED AMOUNT | DATE | STUDY | REQUESTED BY | SUBJECT ID |
|---|---|---|---|---|---|
| Approve All : Decline All | | | | | |
| Approve Items | $300.00 | 06/24/2010 | Travel Demo | Samuel Whitaker | Test 1234 |
| approved | $50.00 | Stipend | **Name:** Half Day Visit<br>**Comments/Notes:** Again | **Approver Comment:** | |
| approved | $100.00 | Stipend | **Name:** Full Day Visit<br>**Comments/Notes:** Again | **Approver Comment:** | |
| pending ▼ | $50.00 | Stipend | **Name:** Half Day Visit<br>**Comments/Notes:** One last test | **Approver Comment:** | |
| pending ▼ | $100.00 | Stipend | **Name:** Full Day Visit<br>**Comments/Notes:** One last test | **Approver Comment:** | |
| Approve Items | $0 | 06/24/2010 | Travel Demo | Samuel Whitaker | abcdetest |

Apply Changes

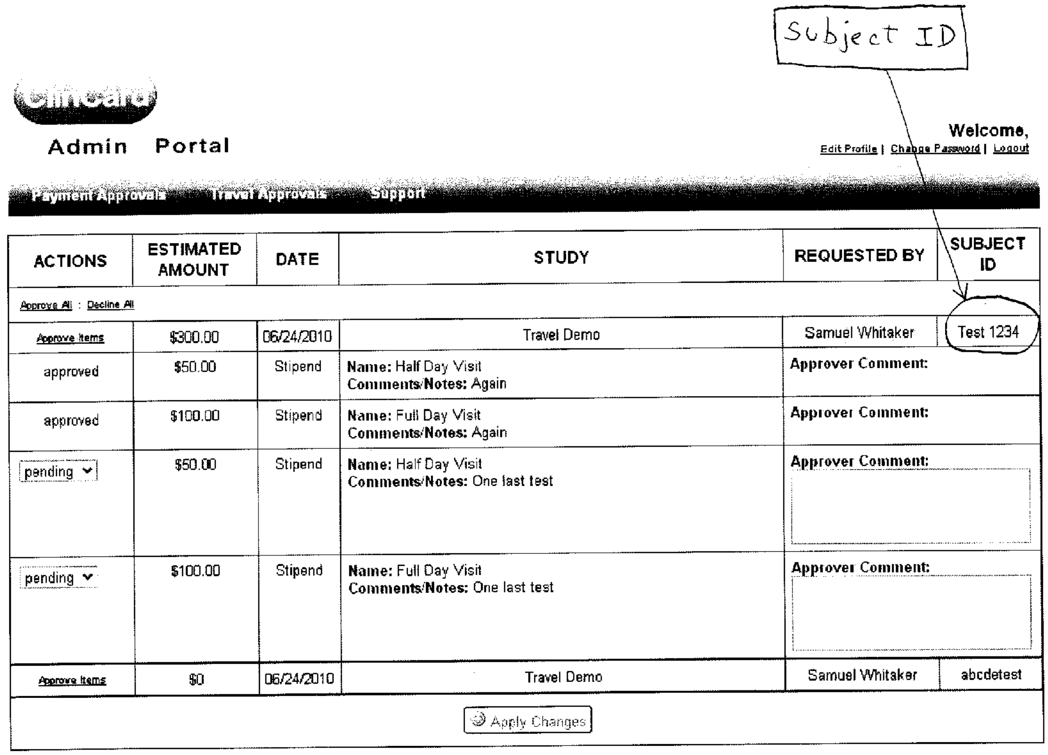

FIGURE 32

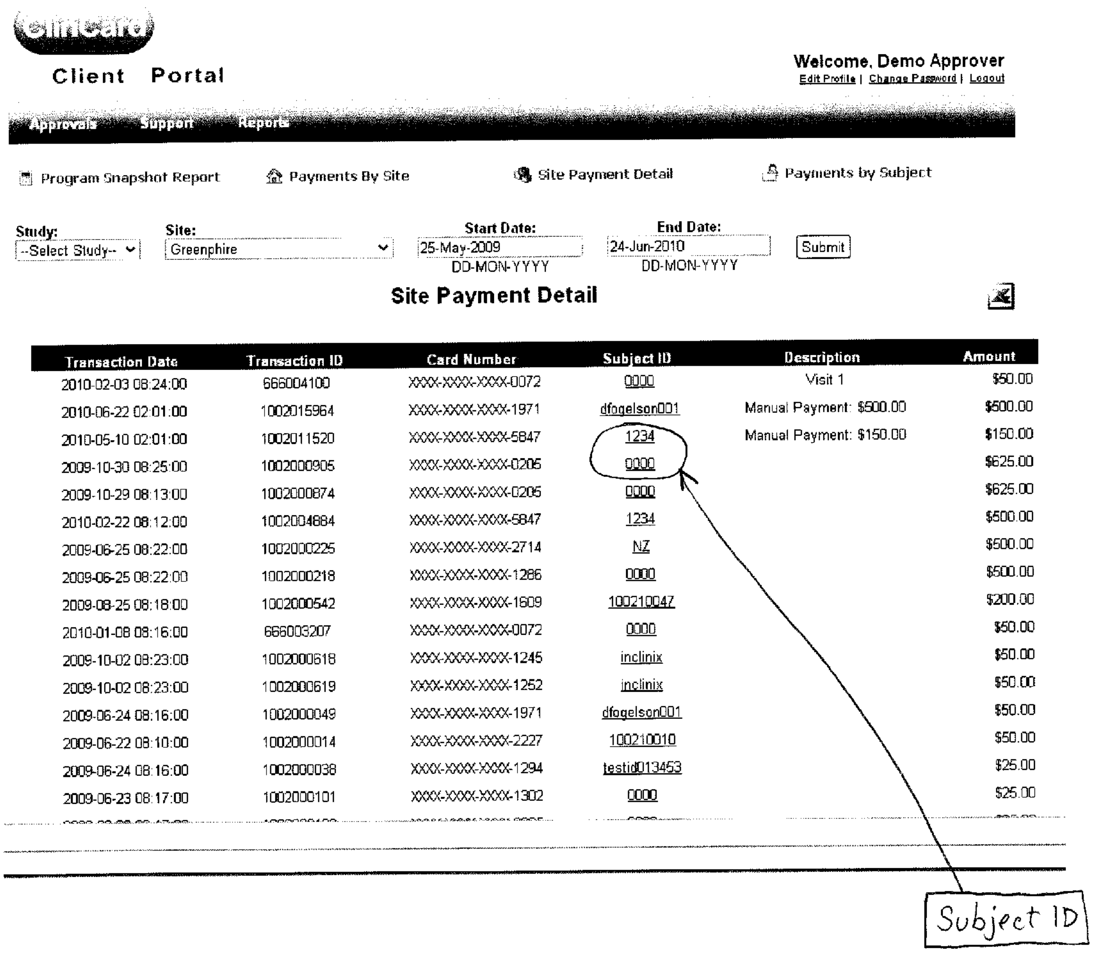

| Transaction Date | Transaction ID | Card Number | Subject ID | Description | Amount |
|---|---|---|---|---|---|
| 2010-02-03 08:24:00 | 666004100 | XXXX-XXXX-XXXX-0072 | 0000 | Visit 1 | $50.00 |
| 2010-06-22 02:01:00 | 1002015964 | XXXX-XXXX-XXXX-1971 | dfogelson001 | Manual Payment: $500.00 | $500.00 |
| 2010-05-10 02:01:00 | 1002011520 | XXXX-XXXX-XXXX-5847 | 1234 | Manual Payment: $150.00 | $150.00 |
| 2009-10-30 08:25:00 | 1002000905 | XXXX-XXXX-XXXX-0205 | 0000 | | $625.00 |
| 2009-10-29 08:13:00 | 1002000874 | XXXX-XXXX-XXXX-0205 | 0000 | | $625.00 |
| 2010-02-22 08:12:00 | 1002004884 | XXXX-XXXX-XXXX-5847 | 1234 | | $500.00 |
| 2009-06-25 08:22:00 | 1002000225 | XXXX-XXXX-XXXX-2714 | NZ | | $500.00 |
| 2009-06-25 08:22:00 | 1002000218 | XXXX-XXXX-XXXX-1286 | 0000 | | $500.00 |
| 2009-08-25 08:18:00 | 1002000542 | XXXX-XXXX-XXXX-1609 | 100210047 | | $200.00 |
| 2010-01-08 08:16:00 | 666003207 | XXXX-XXXX-XXXX-0072 | 0000 | | $50.00 |
| 2009-10-02 08:23:00 | 1002000618 | XXXX-XXXX-XXXX-1245 | inclinix | | $50.00 |
| 2009-10-02 08:23:00 | 1002000619 | XXXX-XXXX-XXXX-1252 | inclinix | | $50.00 |
| 2009-06-24 08:16:00 | 1002000049 | XXXX-XXXX-XXXX-1971 | dfogelson001 | | $50.00 |
| 2009-06-22 08:10:00 | 1002000014 | XXXX-XXXX-XXXX-2227 | 100210010 | | $50.00 |
| 2009-06-24 08:16:00 | 1002000038 | XXXX-XXXX-XXXX-1294 | testid013453 | | $25.00 |
| 2009-06-23 08:17:00 | 1002000101 | XXXX-XXXX-XXXX-1302 | 0000 | | $25.00 |

FIGURE 33 public.clinclient_reimbursementconfig

| | |
|---|---|
| allow_flying BOOL(1) | Ⓝ Ⓓ |
| auto_approve_user_id SERIAL(10) | Ⓕ |
| allow_other BOOL(1) | Ⓝ Ⓓ |
| program_id SERIAL(10) | Ⓝ Ⓕ |
| allow_driving BOOL(1) | Ⓝ Ⓓ |
| id SERIAL(10) | Ⓝ Ⓓ Ⓟ |
| auto_approve BOOL(1) | Ⓝ Ⓓ |
| Index clinclient_reimbursementconfig_pkey(id) | |
| Index clinclient_reimbursementconfig_auto_approve_user_id (auto_approve_user_id) | |
| Index clinclient_reimbursementconfig_program_id(program_id) | |

→ 1/36B public.core_program

| | |
|---|---|
| id SERIAL(10) | Ⓝ Ⓓ Ⓟ |
| name VARCHAR(256) | Ⓝ |
| description TEXT(2147483647) | |
| client_id SERIAL(10) | Ⓝ |
| floor NUMERIC(10) | |
| ceiling NUMERIC(10) | |
| default_payment NUMERIC(5) | Ⓝ |
| allow_sms BOOL(1) | Ⓝ Ⓓ |
| allow_email BOOL(1) | Ⓝ Ⓓ |
| prefix VARCHAR(6) | Ⓝ |
| extension VARCHAR(3) | Ⓝ |
| cardholder_agreement VARCHAR(512) | |
| program_id VARCHAR(4) | |
| travel_payment_allowed BOOL(1) | Ⓝ Ⓓ |
| preset_payment_allowed BOOL(1) | Ⓝ Ⓓ |
| manual_payment_allowed BOOL(1) | Ⓝ Ⓓ |
| card_package_id VARCHAR(100) | |
| use_new_reports BOOL(1) | Ⓝ Ⓓ |
| Index core_program_pkey(id) | |
| Index core_program_client_id(client_id) | |

→ 2/36B
→ 3/36B
→ 4/36E
→ 5/36F

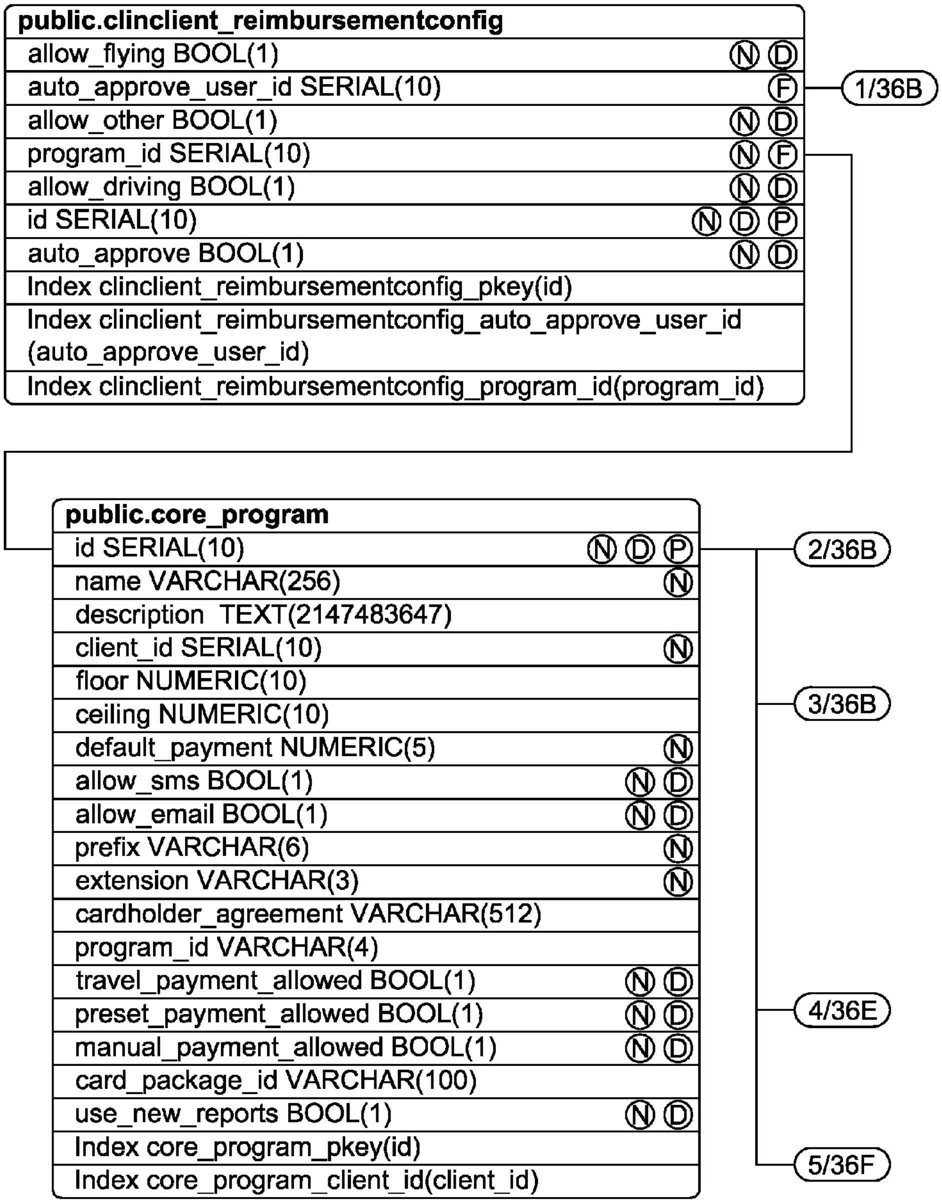

*Figure 36A* public.clinclient_approver

| | |
|---|---|
| ceiling NUMERIC(10) | |
| floor NUMERIC(10) | |
| id SERIAL(10) | Ⓝ Ⓓ Ⓟ |
| user_id SERIAL(10) | Ⓝ |
| program_id SERIAL(10) | Ⓝ Ⓕ |
| Index clinclient_approver_pkey(id) | |
| Index clinclient_approver_program_id(program_id) | |
| Index clinclient_approver_user_id(user_id) | |

(1/36A) — id; (6/36C) — id
(2/36A) — program_id public.core_study

| | |
|---|---|
| program_id SERIAL(10) | Ⓝ Ⓕ |
| name VARCHAR(256) | Ⓝ |
| description TEXT(2147483647) | |
| ssn_req BOOL(1) | Ⓝ Ⓓ |
| patient_id_req BOOL(1) | Ⓝ Ⓓ |
| image VARCHAR(100) | |
| initials_req BOOL(1) | Ⓝ Ⓓ |
| real_time_payments BOOL(1) | Ⓝ Ⓓ |
| Index core_study_pkey(empty) | |
| Index core_study_program_id(program_id) | |

(3/36A) — program_id

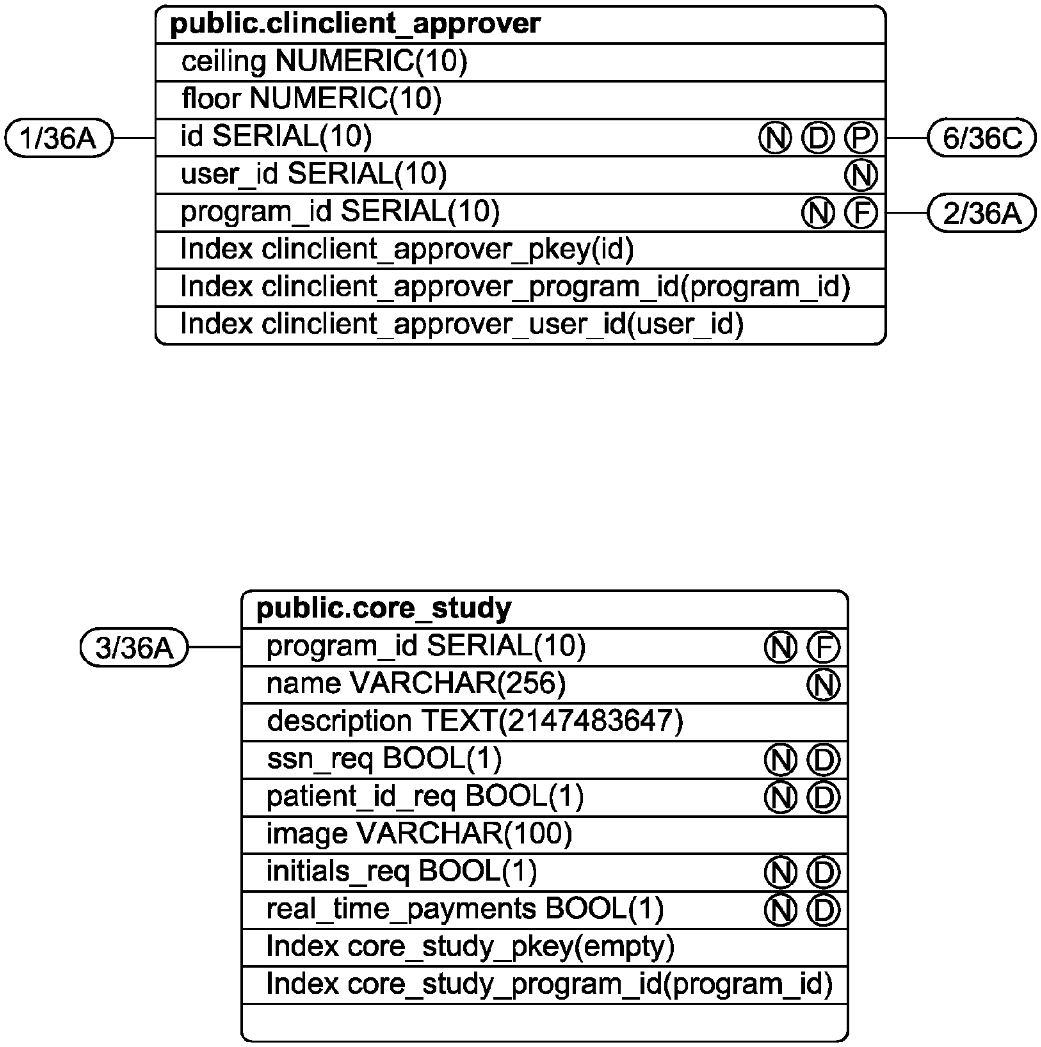

*Figure 36B*

| public.clinclient_reimbursementrequest | |
|---|---|
| status VARCHAR(30) | Ⓝ Ⓓ |
| reviewed_by_id SERIAL(10) | Ⓕ |
| qualifying_reason VARCHAR(50) | Ⓝ |
| cardholder_id SERIAL(10) | Ⓝ Ⓕ |
| request_date TIMESTAMPTZ(35) | Ⓝ |
| notes TEXT(2147483647) | |
| status_change_date TIMESTAMPTZ(35) | |
| amount NUMERIC(6) | Ⓝ |
| site_coordinator_id SERIAL(10) | Ⓝ Ⓕ |
| id SERIAL(10) | Ⓝ Ⓓ Ⓟ |
| submitted_by_id SERIAL(10) | |
| approved_by_id SERIAL(10) | |
| study_id SERIAL(10) | |
| Index clinclient_reimbursementrequest_pkey(id) | |
| Index clinclient_reimbursementrequest_approved_by_id (approved_by_id) | |
| Index clinclient_reimbursementrequest_cardholder_id (cardholder_id) | |
| Index clinclient_reimbursementrequest_reviewed_by_id (reviewed_by_id) | |
| Index clinclient_reimbursementrequest_site_coordinator_id (site_coordinator_id) | |
| Index clinclient_reimbursementrequest_study_id(study_id) | |
| Index clinclient_reimbursementrequest_submitted_by_id (submitted_by_id) | |

Labels: 6/36B → reviewed_by_id; 7/36D → cardholder_id

| public.clinclient_sitecoordinator | |
|---|---|
| id SERIAL(10) | Ⓝ Ⓓ Ⓟ |
| user_id SERIAL(10) | Ⓝ |
| phone VARCHAR(20) | |
| site_id SERIAL(10) | |
| Index clinclient_sitecoordinator_pkey(id) | |
| Index clinclient_sitecoordinator_user_id(user_id) | |
| Index clinclient_sitecoordinator_user_id_uniq(user_id) | |

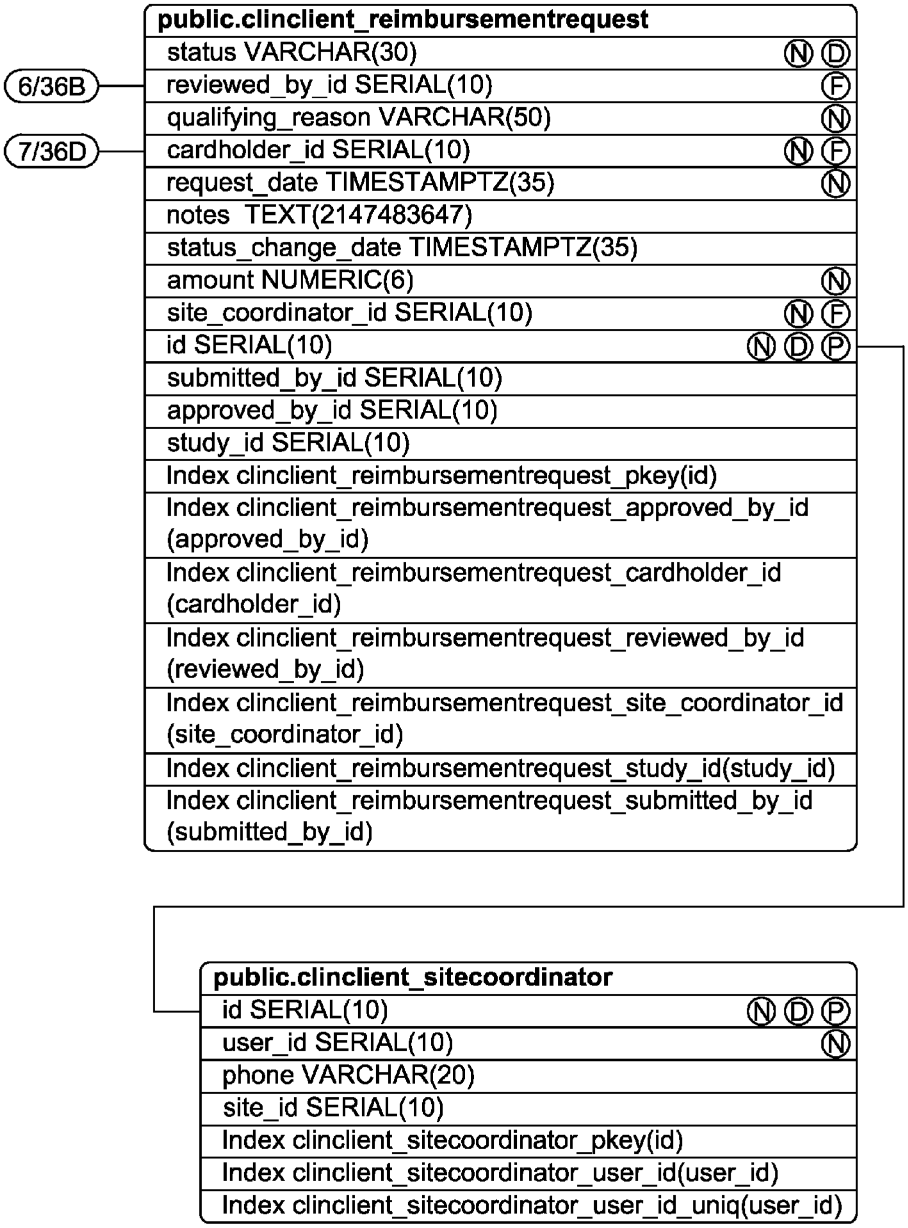

*Figure 36C*

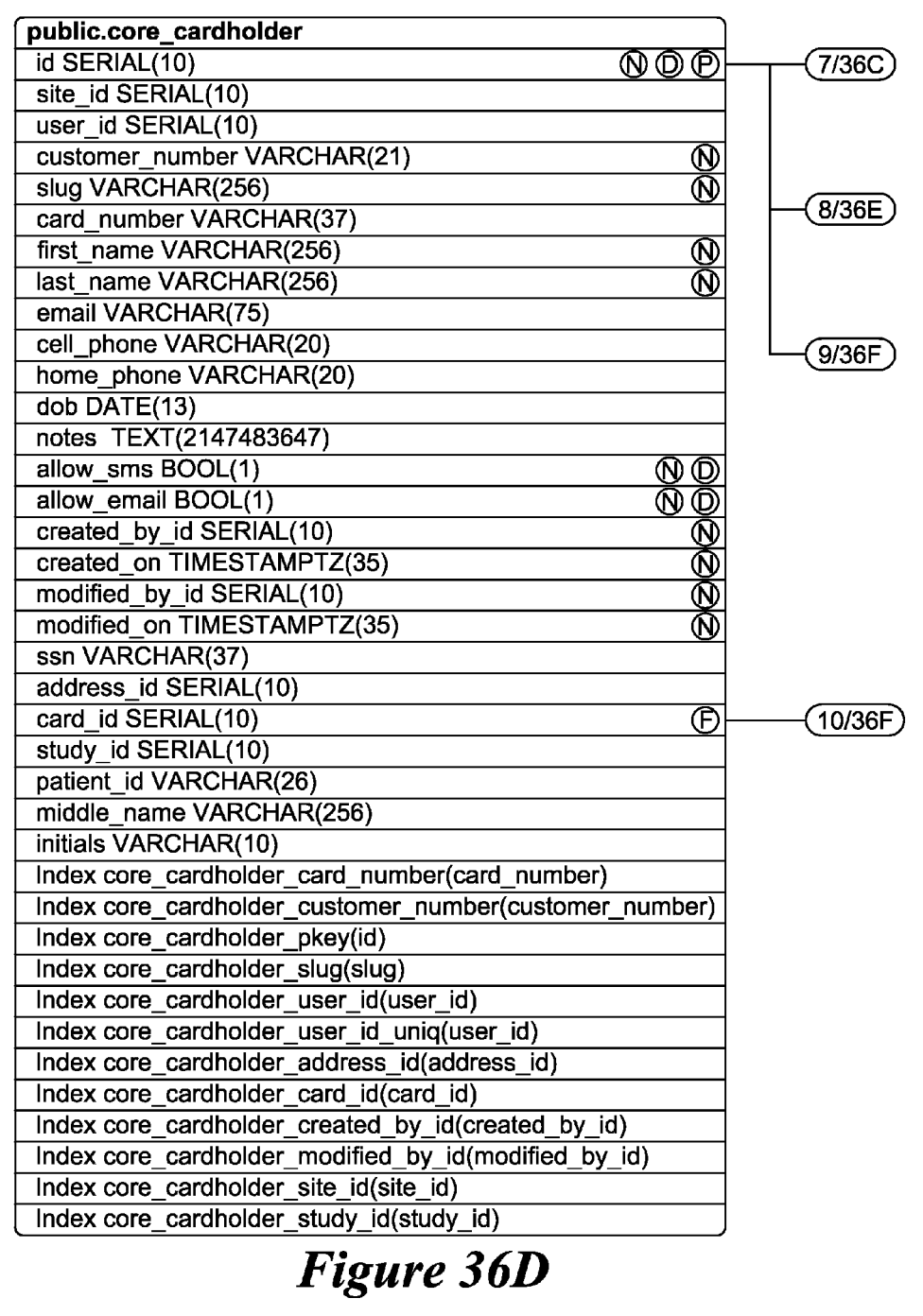

| **public.core_cardholder** | | |
|---|---|---|
| id SERIAL(10) | (N) (D) (P) | 7/36C, 8/36E, 9/36F |
| site_id SERIAL(10) | | |
| user_id SERIAL(10) | | |
| customer_number VARCHAR(21) | (N) | |
| slug VARCHAR(256) | (N) | |
| card_number VARCHAR(37) | | |
| first_name VARCHAR(256) | (N) | |
| last_name VARCHAR(256) | (N) | |
| email VARCHAR(75) | | |
| cell_phone VARCHAR(20) | | |
| home_phone VARCHAR(20) | | |
| dob DATE(13) | | |
| notes TEXT(2147483647) | | |
| allow_sms BOOL(1) | (N) (D) | |
| allow_email BOOL(1) | (N) (D) | |
| created_by_id SERIAL(10) | (N) | |
| created_on TIMESTAMPTZ(35) | (N) | |
| modified_by_id SERIAL(10) | (N) | |
| modified_on TIMESTAMPTZ(35) | (N) | |
| ssn VARCHAR(37) | | |
| address_id SERIAL(10) | | |
| card_id SERIAL(10) | (F) | 10/36F |
| study_id SERIAL(10) | | |
| patient_id VARCHAR(26) | | |
| middle_name VARCHAR(256) | | |
| initials VARCHAR(10) | | |
| Index core_cardholder_card_number(card_number) | | |
| Index core_cardholder_customer_number(customer_number) | | |
| Index core_cardholder_pkey(id) | | |
| Index core_cardholder_slug(slug) | | |
| Index core_cardholder_user_id(user_id) | | |
| Index core_cardholder_user_id_uniq(user_id) | | |
| Index core_cardholder_address_id(address_id) | | |
| Index core_cardholder_card_id(card_id) | | |
| Index core_cardholder_created_by_id(created_by_id) | | |
| Index core_cardholder_modified_by_id(modified_by_id) | | |
| Index core_cardholder_site_id(site_id) | | |
| Index core_cardholder_study_id(study_id) | | |

*Figure 36D*

| public.core_deposit | | |
|---|---|---|
| id SERIAL(10) | | Ⓝ Ⓓ Ⓟ |
| cardholder_id SERIAL(10) | | Ⓝ Ⓕ |
| amount NUMERIC(10) | | Ⓝ |
| created_by_id SERIAL(10) | | Ⓝ |
| created_on TIMESTAMPTZ(35) | | Ⓝ |
| sent BOOL(1) | | Ⓝ Ⓓ |
| sent_notes TEXT(2147483647) | | |
| sent_on TIMESTAMPTZ(35) | | |
| processed BOOL(1) | | Ⓝ Ⓓ |
| processing_notes TEXT(2147483647) | | |
| processed_on TIMESTAMPTZ(35) | | |
| transaction_id SERIAL(10) | | |
| card_id SERIAL(10) | | Ⓕ |
| content_type_id INT4(10) | | |
| object_id INT4(10) | | |
| study_id SERIAL(10) | | |
| Index core_deposit_pkey(id) | | |
| Index core_deposit_card_id(card_id) | | |
| Index core_deposit_cardholder_id(cardholder_id) | | |
| Index core_deposit_content_type_id(content_type_id) | | |
| Index core_deposit_created_by_id(created_by_id) | | |
| Index core_deposit_study_id(study_id) | | |
| Index core_deposit_transaction_id(transaction_id) | | |

(8/36D) → cardholder_id card_id → (4/36A)

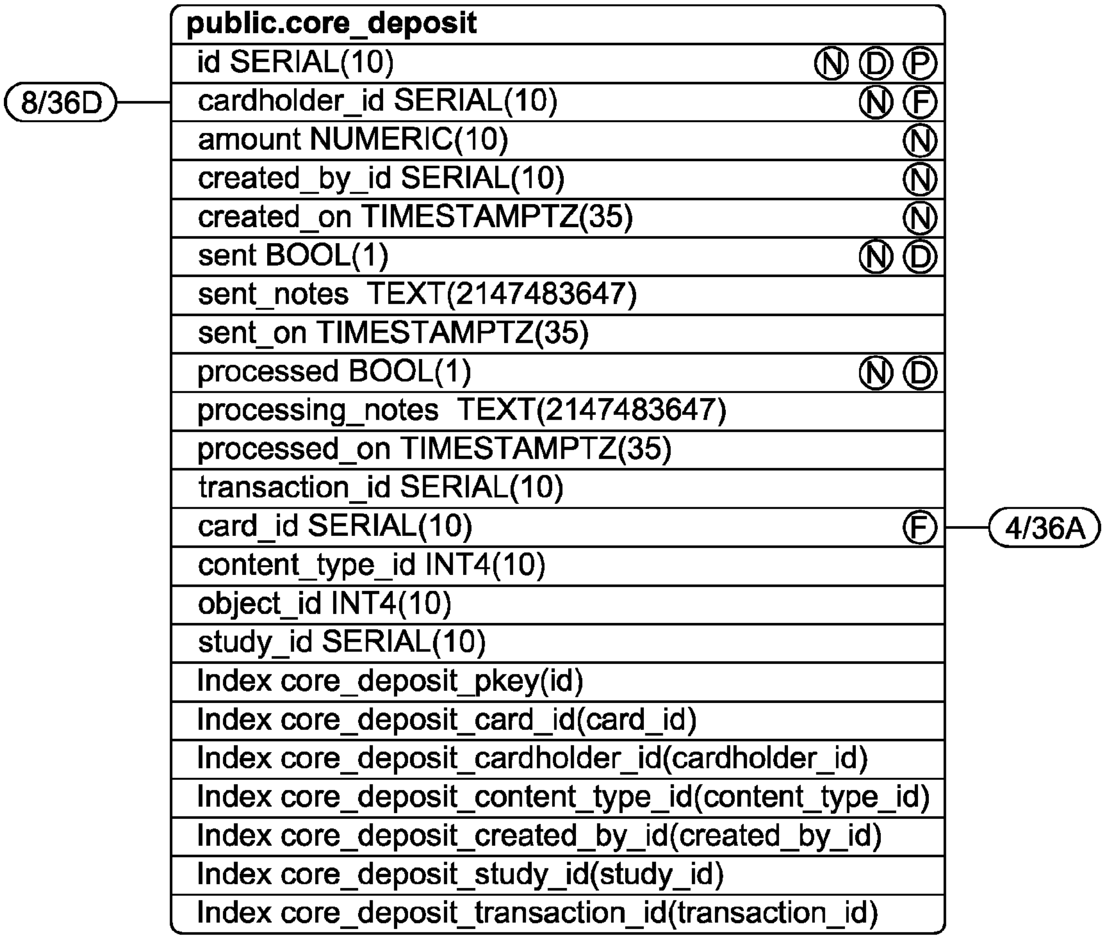

*Figure 36E*

| | | |
|---|---|---|
| | **public.core_card** | |
| | emboss_line_four VARCHAR(250) | |
| | ABA VARCHAR(250) | |
| | expiration_date DATE(13) | |
| | number VARCHAR(229) | Ⓝ |
| 10/36D | id SERIAL(10) | Ⓝ Ⓓ Ⓟ |
| | issuance_type VARCHAR(250) | |
| 5/36A | program_id SERIAL(10) | Ⓝ Ⓕ |
| | emboss_line_three VARCHAR(250) | |
| | date_created TIMESTAMPTZ(35) | |
| | DDA VARCHAR(250) | |
| | is_test_card BOOL(1) | Ⓝ Ⓓ |
| 9/36D | cardholder_id SERIAL(10) | Ⓕ |
| | status VARCHAR(100) | Ⓝ Ⓓ |
| | processor_id SERIAL(10) | |
| | site_id SERIAL(10) | |
| | last_four VARCHAR(229) | |
| | Index core_card_pkey(id) | |
| | Index core_card_cardholder_id(cardholder_id) | |
| | Index core_card_processor_id(processor_id) | |
| | Index core_card_program_id(program_id) | |
| | Index core_card_site_id(site_id) | |

*Figure 36F*

AUTOMATED METHOD OF REPORTING PAYMENTS MADE TO PATIENTS FOR THEIR PARTICIPATION IN A CLINICAL STUDY IN A BLINDED MANNER TO THE SPONSOR OF THE CLINICAL STUDY

CROSS REFERENCE TO RELATED APPLICATION

This application claims the benefit of U.S. Provisional Patent Application No. 61/360,219 filed Jun. 30, 2010, which is incorporated in its entirety herein.

BACKGROUND OF THE INVENTION

Pharmaceutical, medical device and biotechnology (sponsor) companies that wish to bring a product to market in the United States must have their product undergo Food and Drug Administration (FDA) reviewed clinical studies. The purpose of these studies includes testing the efficacy and safety of products on human subjects (also, referred to herein as patients or study participants). Since these studies address the medical status and health aspects of the subjects, the Health Insurance Portability and Accountability Act of 1996 (HIPPA) pertains to the use and disclosure of the subjects' personal health information (PHI) and subject privacy. In addition, guidelines laid out by Department of Health and Human Services (HHS) and the FDA Protection of Human Subjects Regulations (45 CFR part 46 or 21 CFR parts 50 and 56, respectively) lay out guidelines to protect such personal health information from inappropriate use or disclosure. Furthermore, HHS issued regulations entitled "Standards for Privacy of Individually Identifiable Health Information," commonly known as the "Privacy Rule," broadens the scope of patient related information considered private by defining "individually identifiable health information."

All information collected concerning an individual subject throughout the course of a clinical study (including even the most basic data points such as name, address and date of birth) can be considered to fall within the purview of PHI and "individually identifiable health information." Accordingly, it is expected that any and all parties who require access or use of patient information be limited to the minimum amount of information relevant to such a party. For example, the accountant of a clinical study site (investigative site) need not receive access to a patient's name, place of residence, or medical condition in order to reconcile the books of the business.

Clinical studies often provide compensation to study participants for their time, effort and expenses incurred. Typically, this is an expense borne by the sponsor of the study and administered by the study coordinators who interact with the subjects in a trial, and must adhere to the study-specific protocols that govern the study and that detail the structure of patient compensation. Historically, these payments were made via cash or check. Both cash and checks have disadvantages within the clinical study compensation process. Cash provides no reproducible proof of compensation. Checks often take weeks to be issued and require a subject to have a bank account or incur check cashing fees. In addition, it oftentimes proves to be difficult, if not impossible, to provide records to the sponsor or other parties associated with the execution of an ongoing clinical study of the compensation paid to the subjects for the purposes of auditing or reconciliation, without revealing sensitive information which the sponsor should not be exposed to. The present invention addresses this need.

BRIEF SUMMARY OF THE INVENTION

An automated method is provided for reporting payments made to patients for their participation in a clinical study in a blinded manner to the sponsor of the clinical study. The clinical study has a plurality of investigative sites which perform activities in accordance with the protocol of the clinical study. Each patient has patient ID information and is assigned a subject ID that de-identifies the patient. The method operates as follows:

1. Payment requests are received at a software application from the investigative sites associated with patient activity.
2. The software application includes for each patient that is participating in the clinical study, the patient ID information, and the de-identified subject ID. The payment requests are associated with the patient ID information.
3. The payment requests are processed at the software application, and payments that conform to predefined compensation guidelines for the clinical study are approved.
4. The software application generates blinded payment reports for electronic delivery to the sponsor. The payment reports show at least the de-identified subject ID for each approved payment, the payment amounts for each approved payment, and a date associated with the payment. The date may be the date of patient activity, the date of the payment request, or the date of the payment approval.

The patient participation may include patient screening, patient enrollment, or consumption or use of the investigational product associated with the clinical study.

Payment requests are queued via the software application for electronic review and the payments are approved via electronic authorization.

Patients are assigned to their own respective debit cards. Each debit card has a balance. The debit card balances are updated by the software application for the approved payments.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIGS. 5-34 show user interface display screens in accordance with preferred embodiments of the present invention.

FIGS. 36A-36G, taken together, is a database schema in accordance with one preferred embodiment of the present invention.

DETAILED DESCRIPTION OF THE INVENTION

Figure 1:
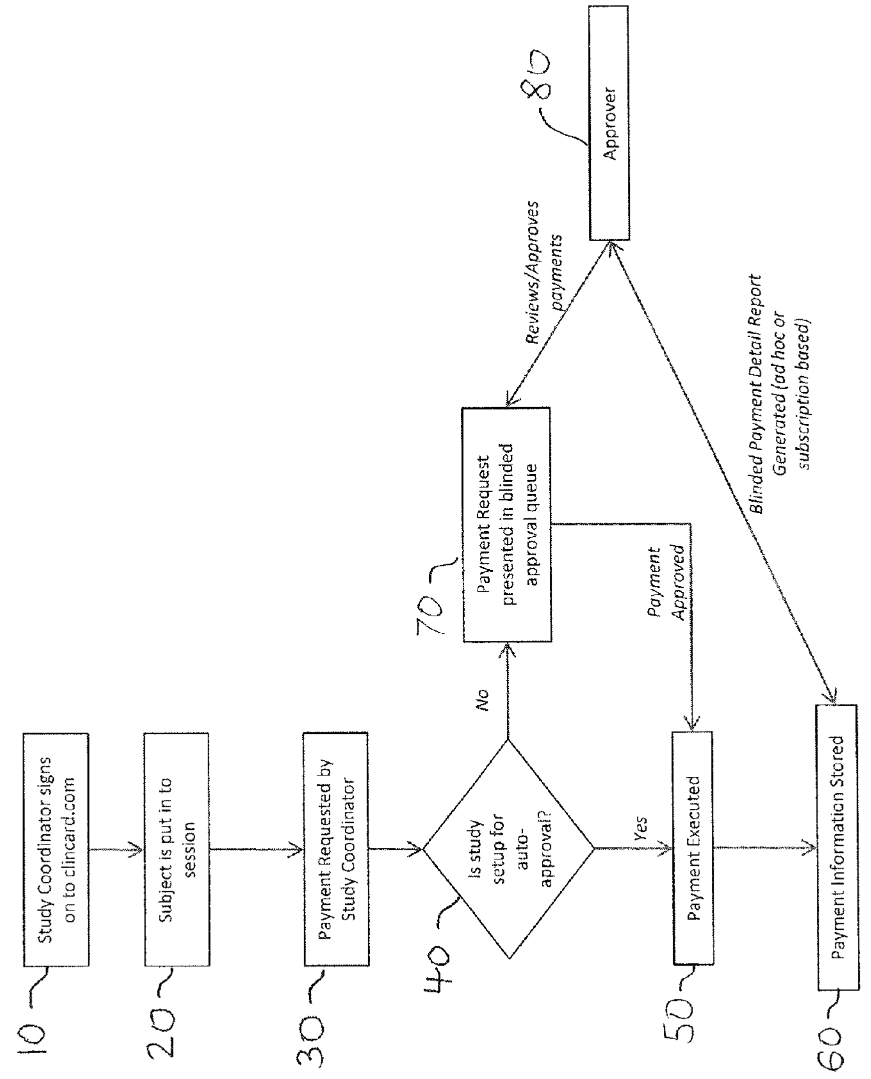
FIG. 1 is a flowchart in accordance with one preferred embodiment of the present invention.

Certain terminology is used herein for convenience only and is not to be taken as a limitation on the present invention.

I. Overview

Developments in payment technology has allowed for the transfer of funds to be provided in a real-time manner via a prepaid debit card, thereby providing the same access to compensation as historic payment methods, while establishing central electronic based records detailing the time, amount, and parties involved in a compensation transaction.

Greenphire LLC (Greenphire), located in King of Prussia, Pa., is a clinical trials technology company that has created an application which allows parties within the clinical study process to utilize the benefits of the prepaid debit card payment technology to provide subject stipend/reimbursement payment. The process in which Greenphire allows for payment approvals and provides reporting of subject compensation provides an innovative instrument in which study participant compensation information can be accessed within the clinical study space while being able to maintain the highest possible commitment to the aforementioned patient privacy rules.

The present invention is described in the context of a payment platform developed by Greenphire that uses a debit card (also known as a bank card or check card), referred to by Greenphire as a "ClinCard®". The ClinCard is a reloadable type of debit card wherein a payer loads funds to the cardholder's card account for the previously described stipend/reimbursement payment in real-time when the appropriate patient milestone has been accomplished. The payment activity associated with the ClinCard is then stored within Greenphire's system, also referred to herein as the "ClinCard system." Utilizing a unique anonymous subject identifier (subject ID), the compensation associated with a subject is able to be reported upon without infringing on the established privacy rights afforded to the subject. That is, the subject ID de-identifies the subject (patient).

The structure of the Greenphire application includes association of a program and study for each cardholder and the card to which they are registered. This allows for payment reports to be generated detailing all of the payments requested under a specific program or study. Greenphire provides these reports to parties within a study in a blinded fashion by providing payment records that only display a patient ID (also, referred to herein as "subject ID") and includes no information that could be classified as individually identifiable health information. This blinded reporting thereby allows for supervision and reconciliation of patient payments for a study to be conducted without compromising the impartiality expected by the FDA of a sponsor, Contract Research Organization (CRO), investigator site, vendor or other party. As demonstrated in the disclosure below, the Greenphire system is able to concurrently associate a payment with a subject within a clinical study and present such information in a Sponsor level report that conveys program/study payment using a database entity defined as "Patient ID."

FIG. 1 is a flowchart of one preferred embodiment of the Greenphire system. A Study Coordinator signs onto clincard-.com (step 10) and selects an individual subject to act upon (known as putting the subject "in session"). Next, payment is requested by the Study Coordinator (step 30). If the study is set up for auto-approval ("Yes" output of step 40), then payment is executed (step 50) and payment information is stored (step 60). If the study is not set up for auto-approval ("No" output of step 40), then a payment request is presented in a blinded approval queue (step 70). An approver reviews/approves payments (step 80). Upon approval, payment is executed (step 50) and payment information is stored (step 60). A blinded payment detail report is also generated in conjunction with step 80.

II. Detailed Disclosure

A. Web Portals

Figure 2:
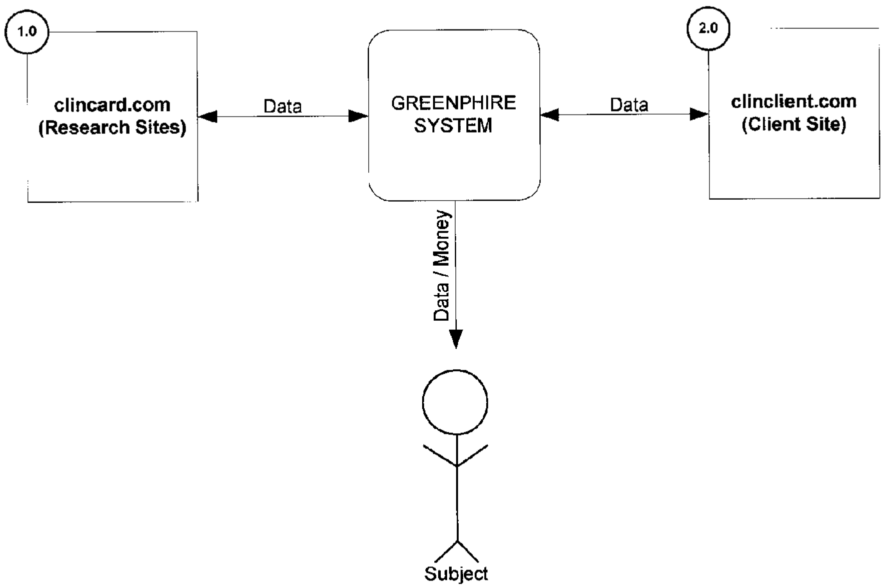
FIGS. 2-4 are data flow diagrams in accordance with one preferred embodiment of the present invention.

FIG. 2 illustrates the following two primary web portals of the ClinCard system:

1.0. www.clincard.com—a web portal used by research sites (investigative sites) in order to both manage subject data within the ClinCard system and take action on subject accounts in order to deliver payments.

Figure 3:
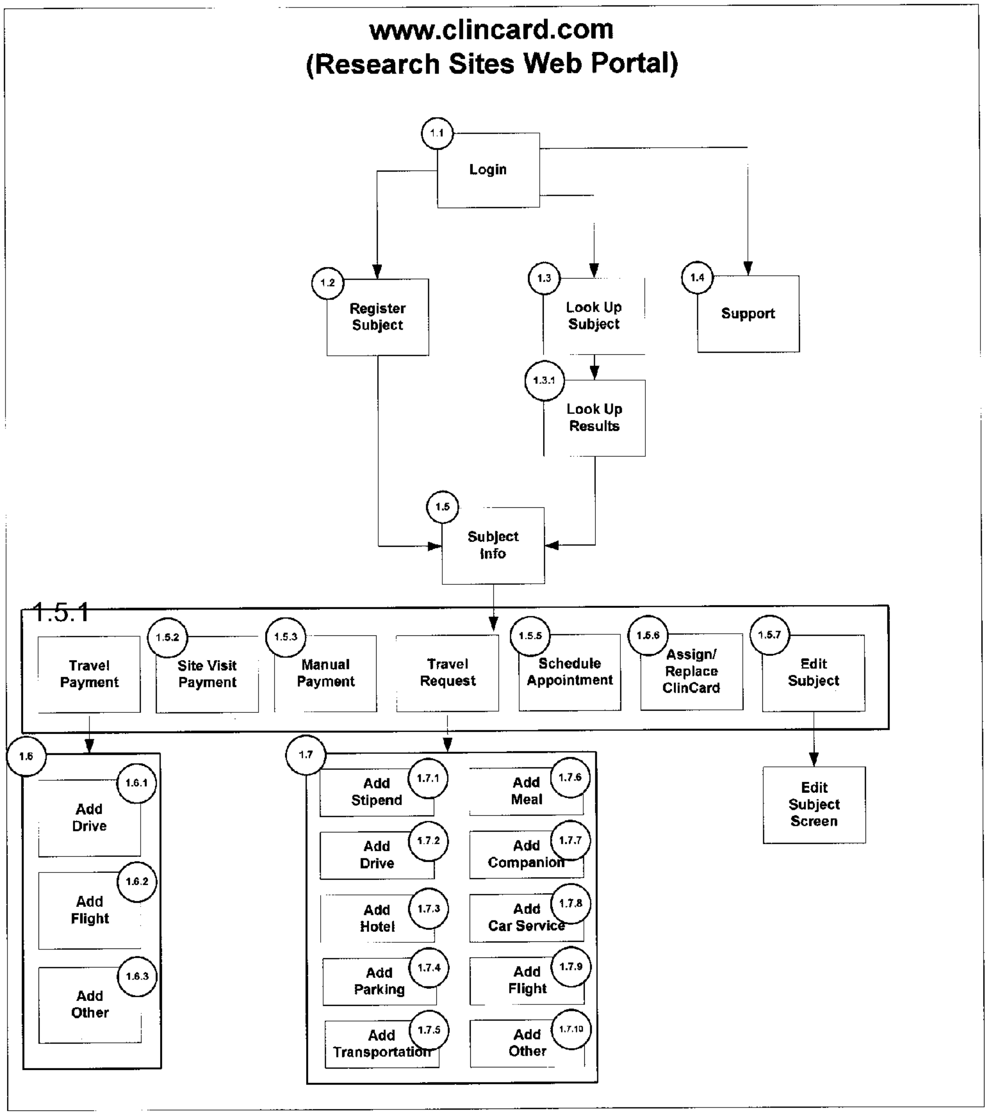

The www.clincard.com web portal is configured for each client on a program and study basis so that various combinations of functionality may be made available to a research-site-level user of the www.clincard.com web portal to take certain types of actions and perform certain types of activities on a particular subject who is associated with a certain program or study. FIG. 3 shows one preferred embodiment of the functional structure of the ClinCard web portal. The corresponding user interface display screens are shown in section B below.

Figure 4:
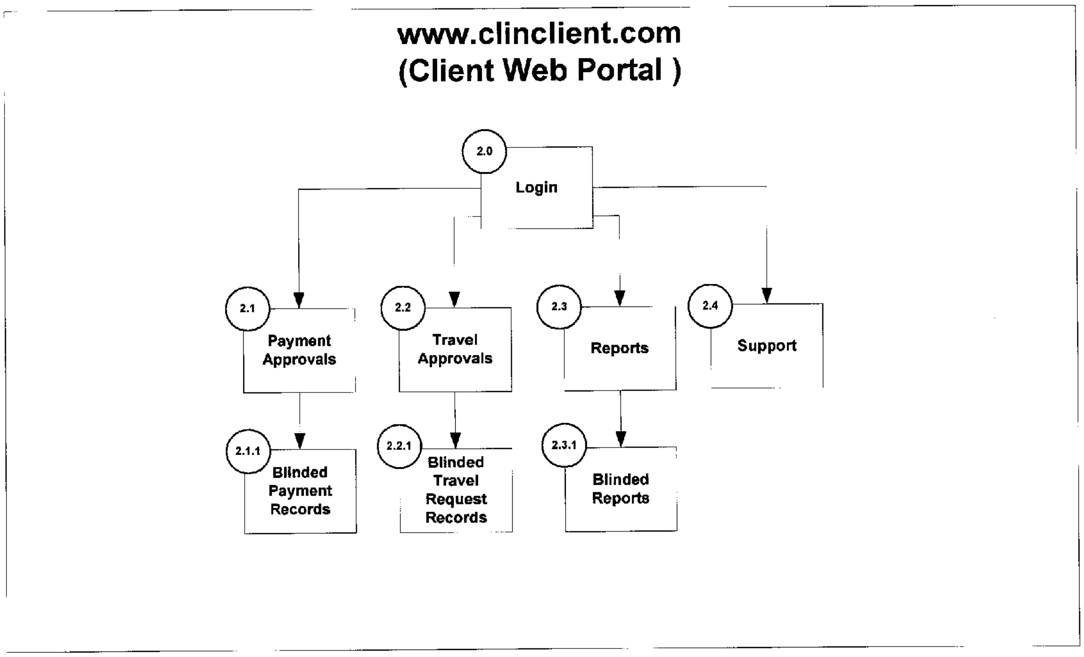

2.0. www.clinclient.com—a web portal used by ClinCard system clients used to view reports on and approve site level subject related activity. The www.clinclient.com web portal is the web interface by which the client may review, approve or decline all blinded payment information and travel requests. Additionally, www.clinclient.com, allows the client to view blinded reports and contact ClinCard support with any questions or requests. FIG. 4 shows one preferred embodiment of the functional structure of the www.clinclient.com web portal. The corresponding user interface display screens are shown in section B below.

Figure 5:
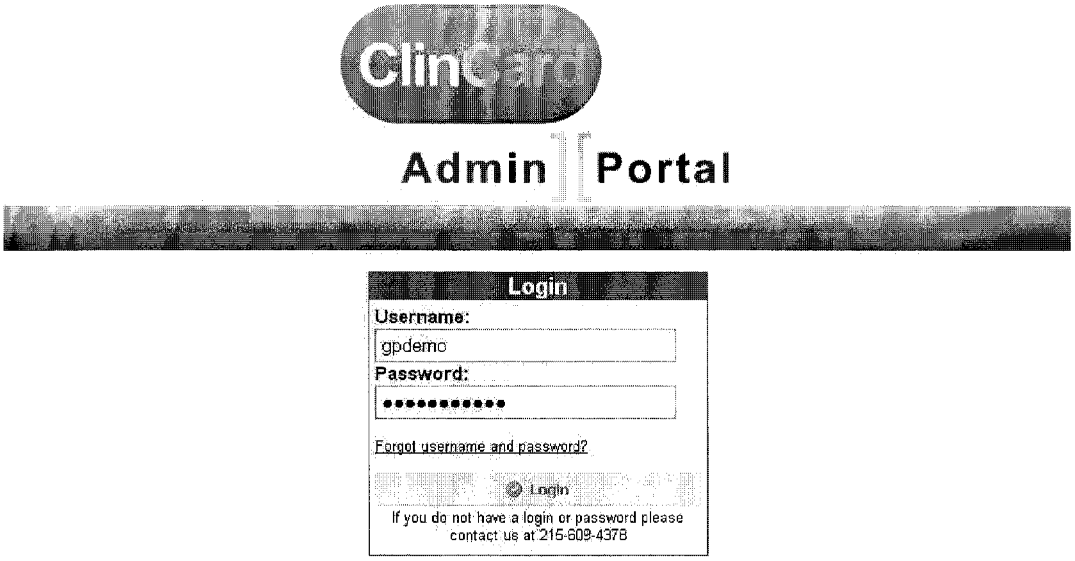

B. User Interface Display Screens 1.1 Login Screen (FIG. 5)

The login screen allows a user who has been provided a username and password the ability to login to the www.clincard.com web portal. Functionality also exists to all an authorized user to retrieve a forgotten username and/or password or contact a dedicated support team in order to get help.

Figure 6:
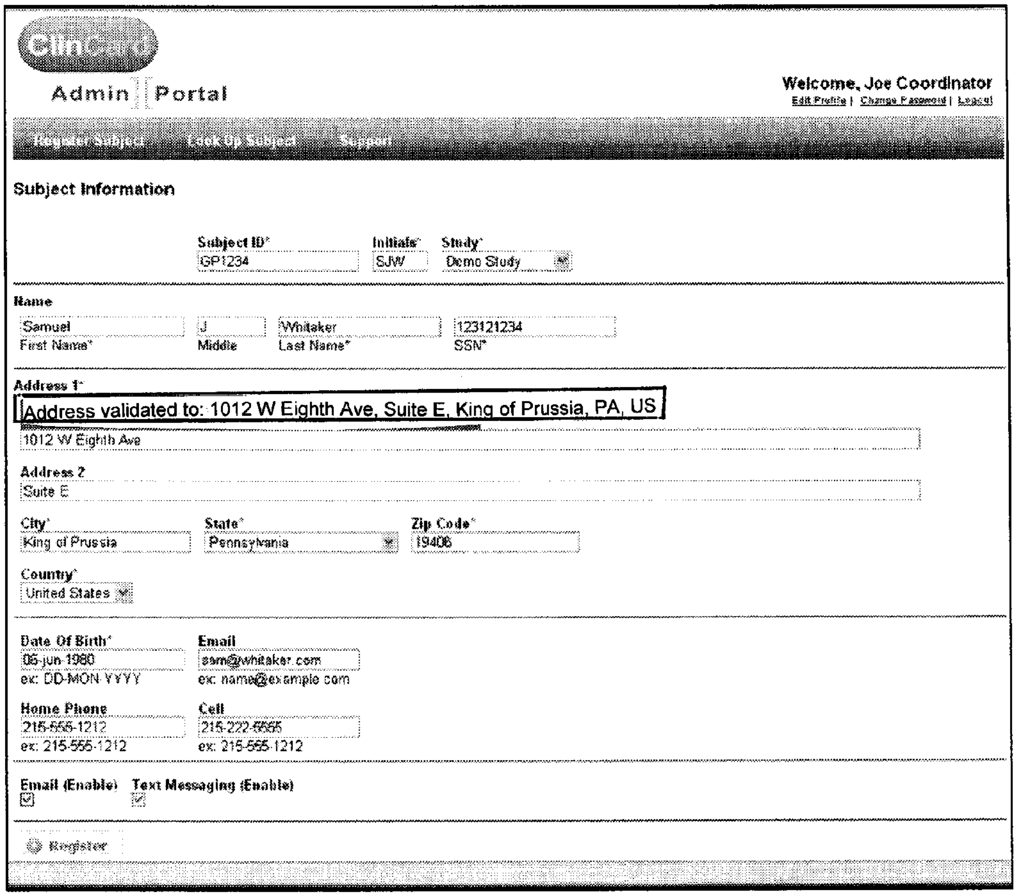

1.2 Subject Registration Screen (FIG. 6)

The Subject Registration screen allows a user of the www.clincard.com web portal to create a new subject record in the ClinCard system which may then be acted upon. The registration screen captures data on each subject that is used for both identifying the subject for customer service, payment processing, blinded client approvals, blinded client reporting and optional IRS reporting. This data is also referred to herein as "subject ID information," or "patient ID information." This data is not usable as a patient ID or subject ID because it does not de-identify the subject or patient.

Fields included on the Subject Registration screen may appear or disappear from the user's perspective based on the study that is selected in which the subject is associated. For example, for some studies, IRS reporting on subject payments is not required and in those cases the "SSN" field would not appear and would not be required.

Additionally, the Subject Registration screen validates addresses entered into the system in real time in order to minimize human error or incorrect data entry by referencing a mapping database.

Figure 7:
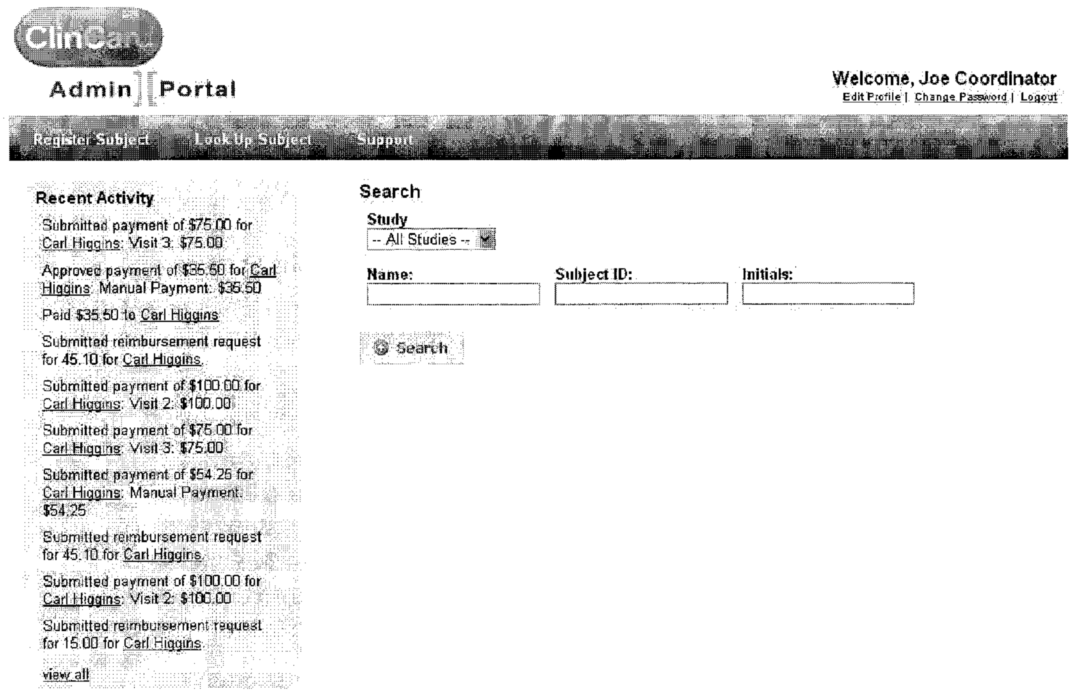

1.3 Look Up Subject Screen (FIG. 7)

Because a subject only has to be registered in the ClinCard System one time, the user "lands" on the Look Up Subject screen. The Look Up Subject screen gives the user the ability to access a subject record that is associated with each research site location and each study that the user is associated with in the ClinCard System.

Figure 8:
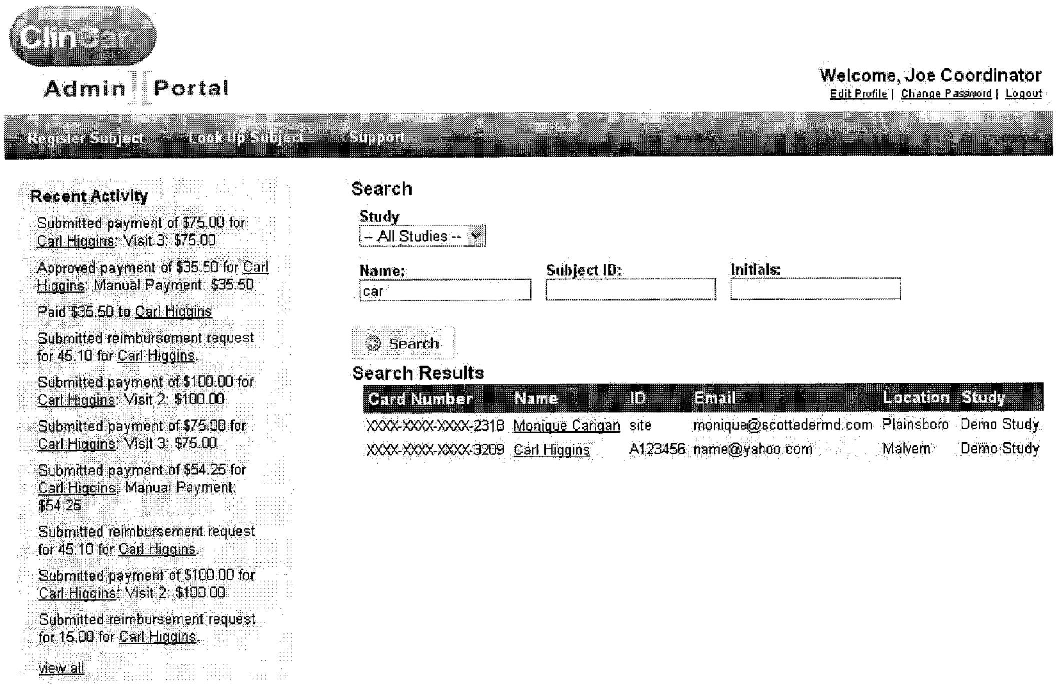

1.3.1 Look Up Subject Results (FIG. 8)

The Look Up Subject Results screen provides a list of subject records. Any subject record may be selected by clicking on the name of the desired subject. Searches may be executed by entering all or part of a subject's Name, Subject ID and/or Initials. By selecting a study, the search is limited to subjects associated with a single study. Only studies in which the user is associated in the ClinCard system are available for the user to select from. Only subject records that are associated with a study and site in which the user is associated with can be viewed by the user.

Figure 9:
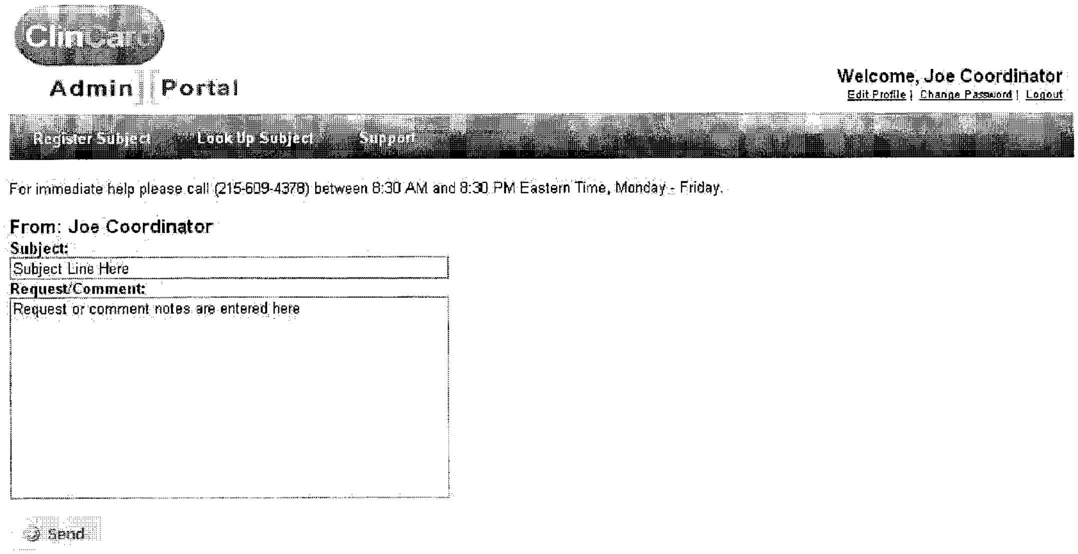

1.4 Support Screen (FIG. 9)

The Support screen is utilized by the user in order to contact the ClinCard support team either through an email form, by calling a designated telephone number that is specifically associated with the user's research site, or by viewing study specific support documents that are related to a study or multiple studies in which the user is associated that may be linked to the Support screen for view only or download.

Figure 10:
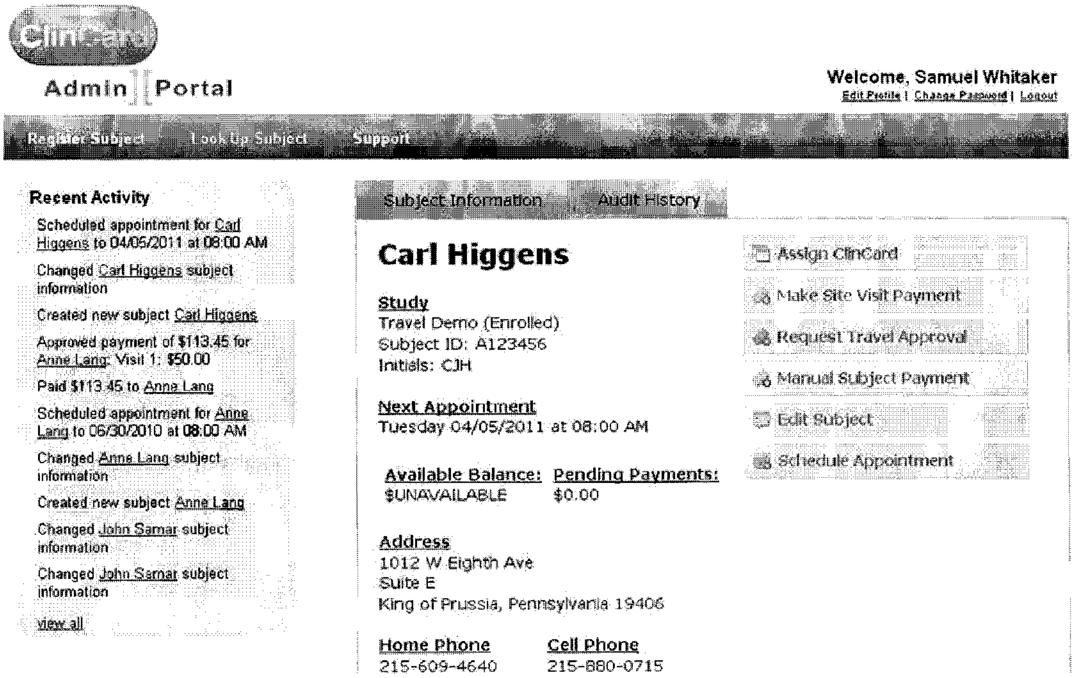

1.5 Subject Information Screen (FIG. 10)

Once a user either successfully registers a new subject or looks up and selects a subject that already exists in the ClinCard System, the user will see the Subject Information screen. The Subject Information screen displays "dashboard" information to the user about the subject, allows the user to view an Audit History of all actions that have ever been taken on that individual subject record, and allows the user to select an "Action Button" which enables the user to perform actions on the subject's account or enter data related to the subject's account that will be used to take action on the subject's account.

Figure 11:
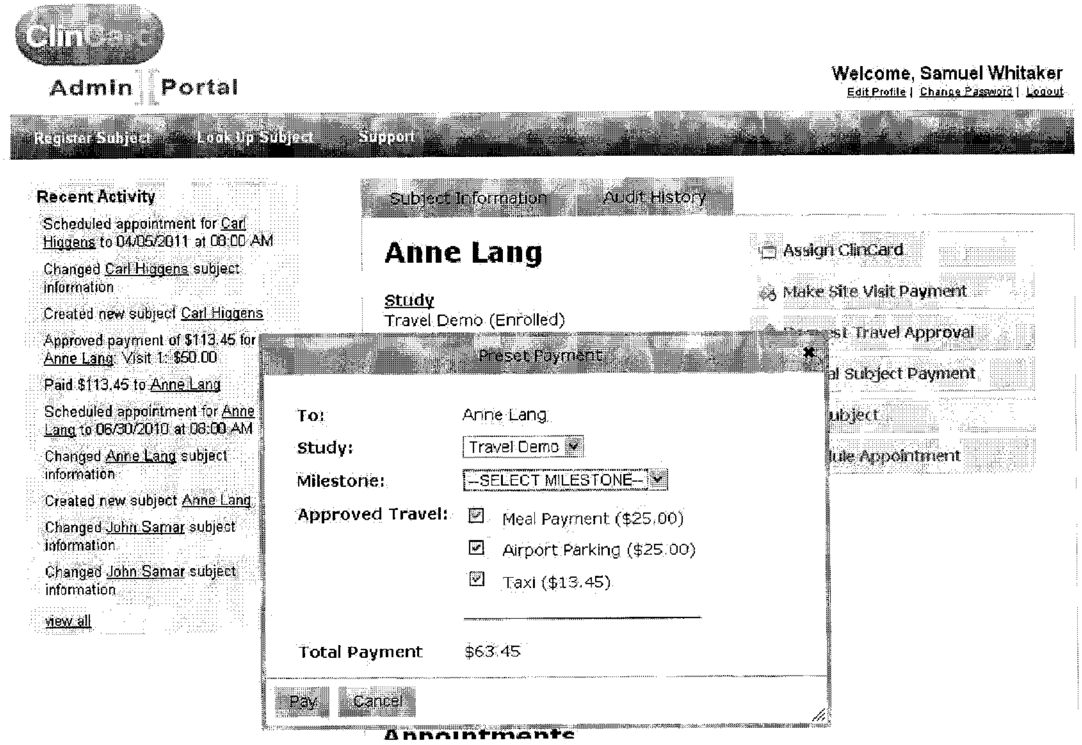

1.5.2 Subject Information Screen—Site Visit Payment (FIG. 11)

When the user clicks on "Make Site Visit Payment" the "Preset Payment" pop-up box appears. The user may select a study specific milestone that is pre-programmed into the ClinCard system. A milestone may or may not have a flat dollar value associated with it. Additionally, if travel items have been approved by the client and carry a reimbursement value that is to be delivered to the subject's account via the ClinCard, a user can select or deselect each line item in order to deliver the correct payment amount to the subject.

Figure 12:
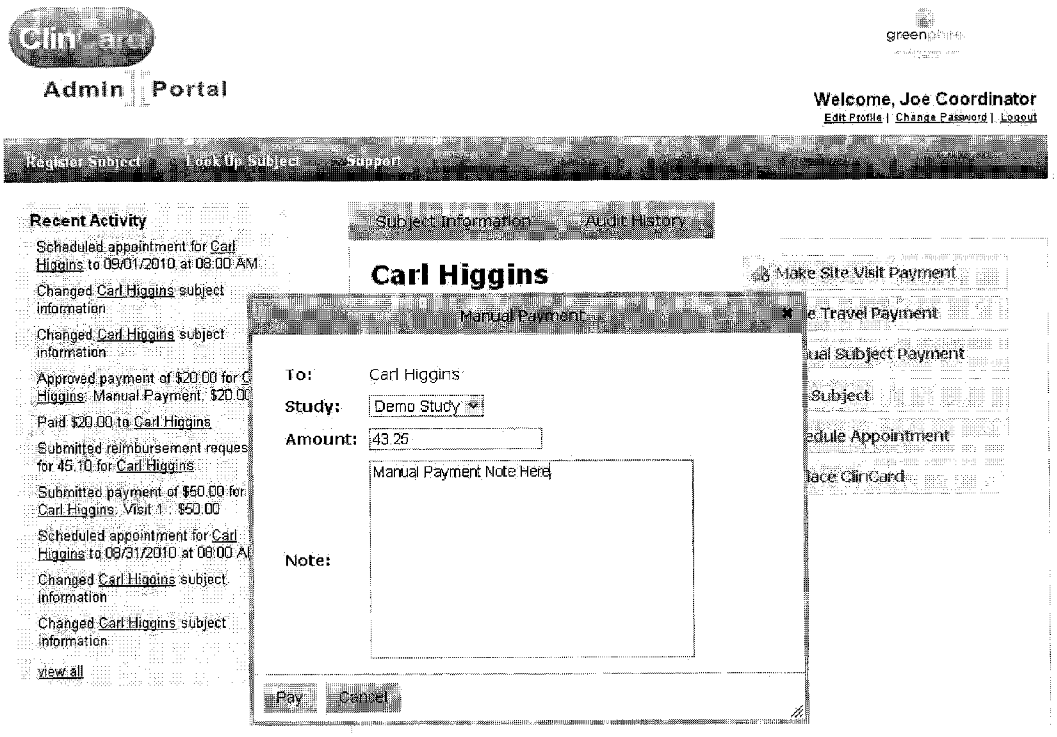

1.5.3 Subject Information Screen—Manual Payment (FIG. 12)

When the user clicks on "Manual Subject Payment" the "Manual Payment" pop-up box appears. The Manual Payment functionality allows the user to enter a variable amount between a certain range that is configured and set by the Client. A ceiling and a floor amount is programmed into the ClinCard system so that a user may not enter an amount greater than the ceiling and lower than the floor. A note must be entered into the Note field so that the ClinCard system can report to the client why the manual payment was made to the subject.

Figure 13:
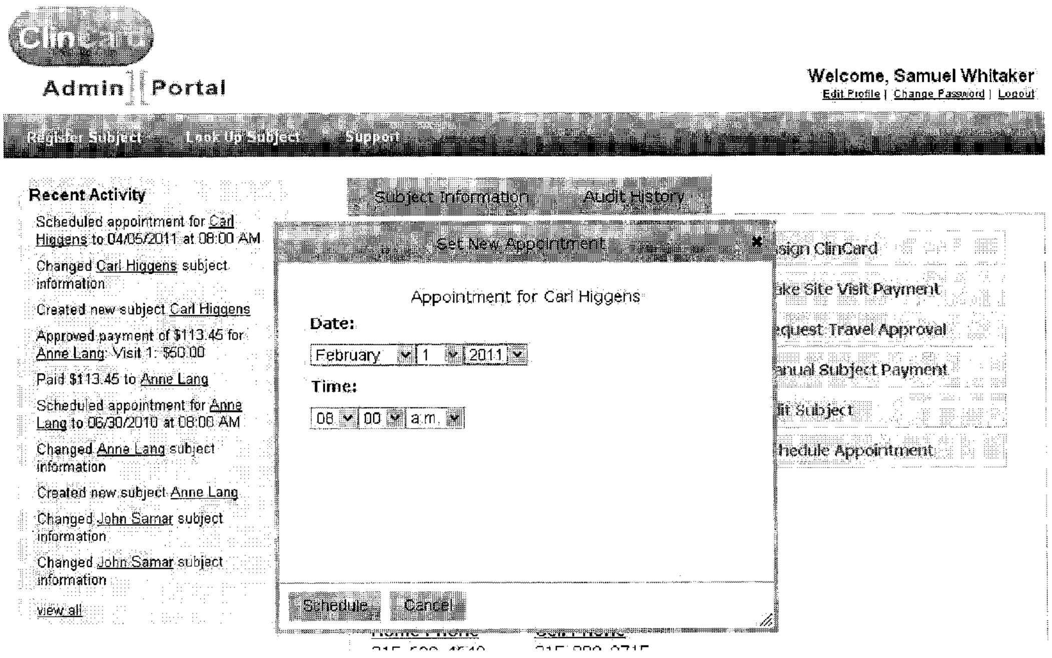

1.5.5 Subject Information Screen—Schedule Appointment (FIG. 13)

When the user clicks on "Schedule Appointment" the "Set New Appointment" pop-up box appears. The Schedule Appointment pop up box allows the user to input upcoming appointment dates into the ClinCard system for a single subject. Once appointment dates are entered, the ClinCard system is able to deliver appointment reminders to the subject based on a predetermined and study specific delivery schedule. Message content is also variable based on the study.

Figure 14:
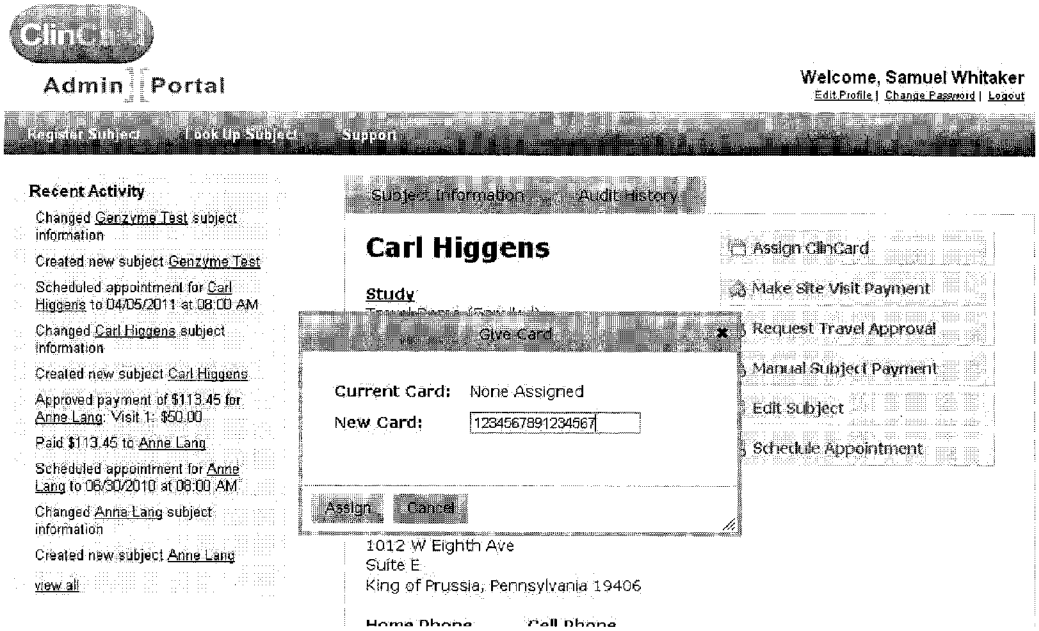

1.5.6 Subject Information Screen—Assign/Replace ClinCard (FIG. 14)

When the user clicks on "Assign ClinCard" the "Give Card" pop-up box appears. The Assign ClinCard function is used to associate an individual subject with a specific 16 digit ClinCard number. After a subject is initially assigned a 16 digit card number, the Assign ClinCard functionality will allow the user to replace the 16 digit card number with a new 16 digit card number. This is especially helpful in the event that a subject has lost his/her ClinCard and requests that a new ClinCard be provided. When a ClinCard is replaced, the ClinCard system "deactivates" the previous card and moves any money that was associated with the previous card over to the newly assigned card.

Figure 15:
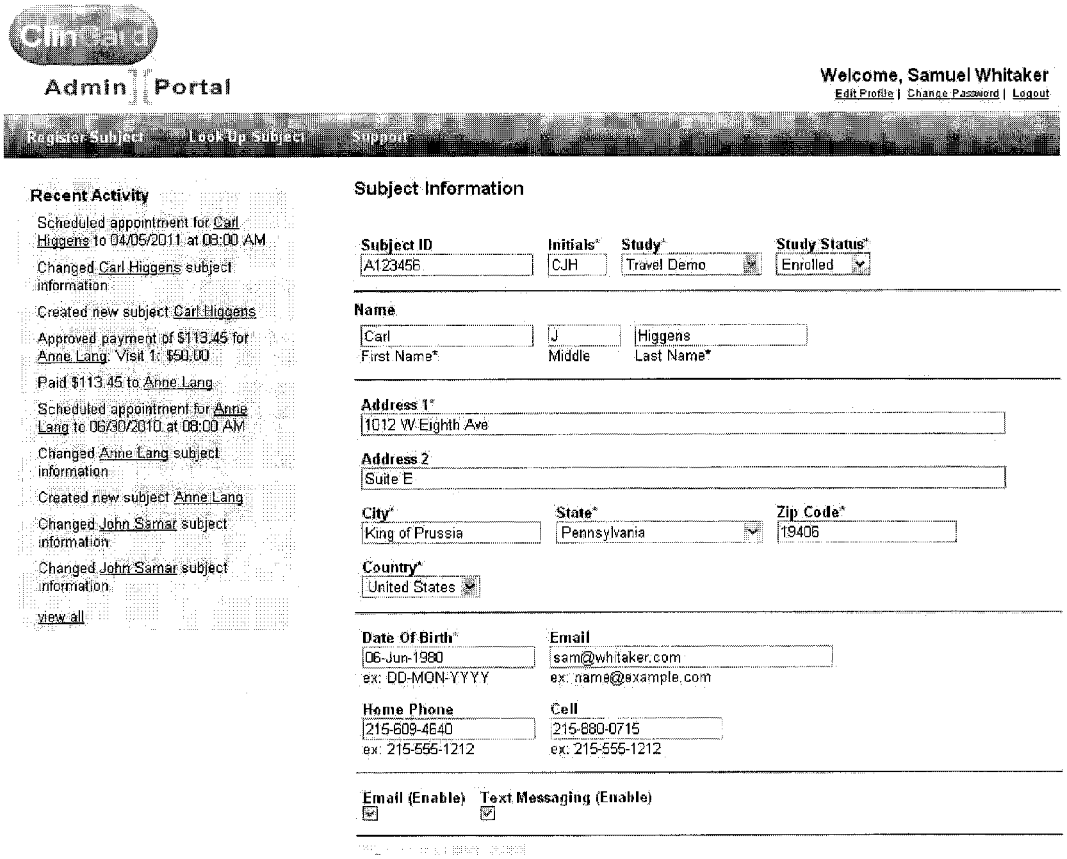

1.5.7 Subject Information Screen—Edit Subject (FIG. 15)

When the user clicks on "Edit Subject" the "Subject Information" screen appears. The Edit Subject screen is available for the user in order for the user to adjust the registration information that was originally associated with the individual subject.

Figure 16:
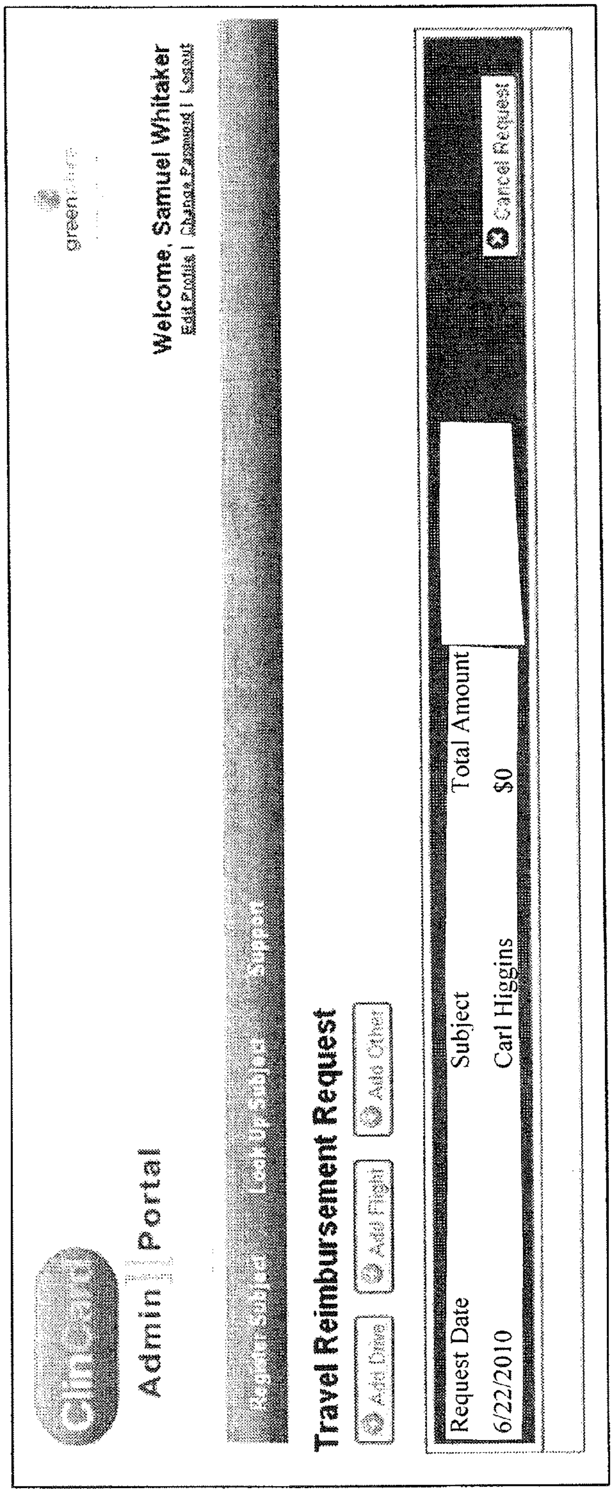

1.6 Travel Payment Screen (FIG. 16)

When the user clicks on "Make Travel Payment" button on the Subject Information screen, the user is brought to the Travel Payment Screen. The Travel Payment Screen provides the user with a range of line items from which the user may choose from and then submit requests to be processed by the ClinCard system or approved by the designated approver at the client.

Figure 17:
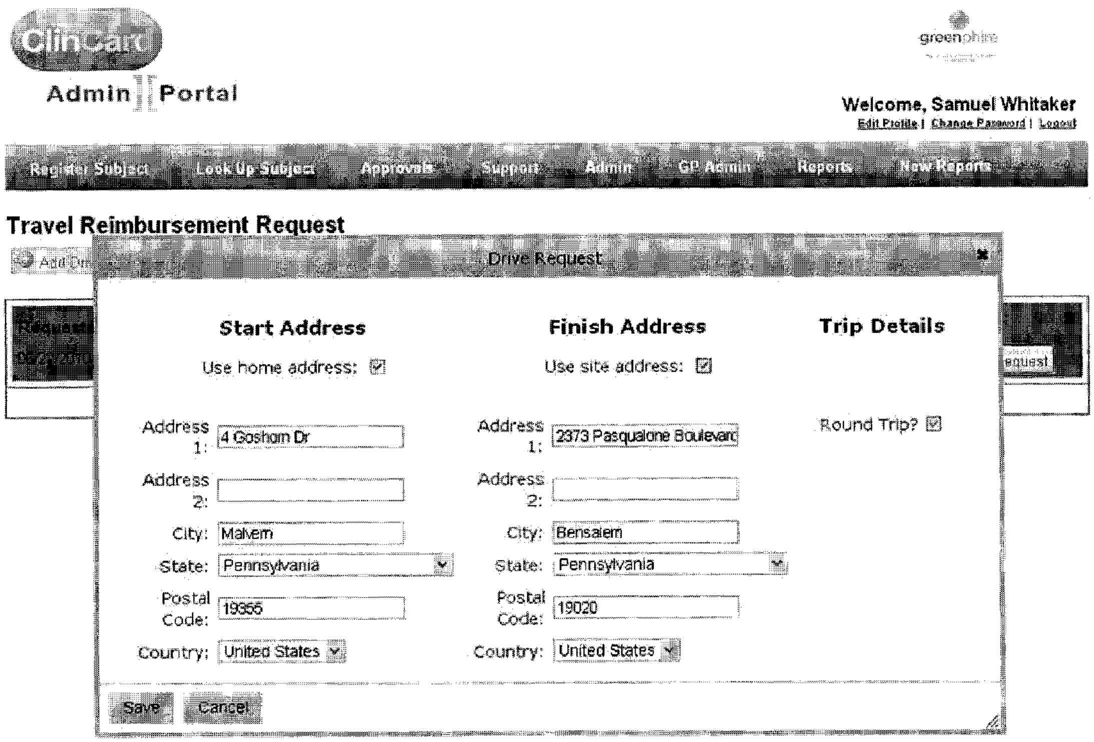

1.6.1 Travel Payment Screen—Drive Request (FIG. 17)

When the user clicks on Add Drive a pop up screen appears that pre-populates start and end addresses for a drive to and from the research site. The start address is equal to the subject's home address as submitted to the system during the registration process. The end address is pre-populated.

Figure 18:
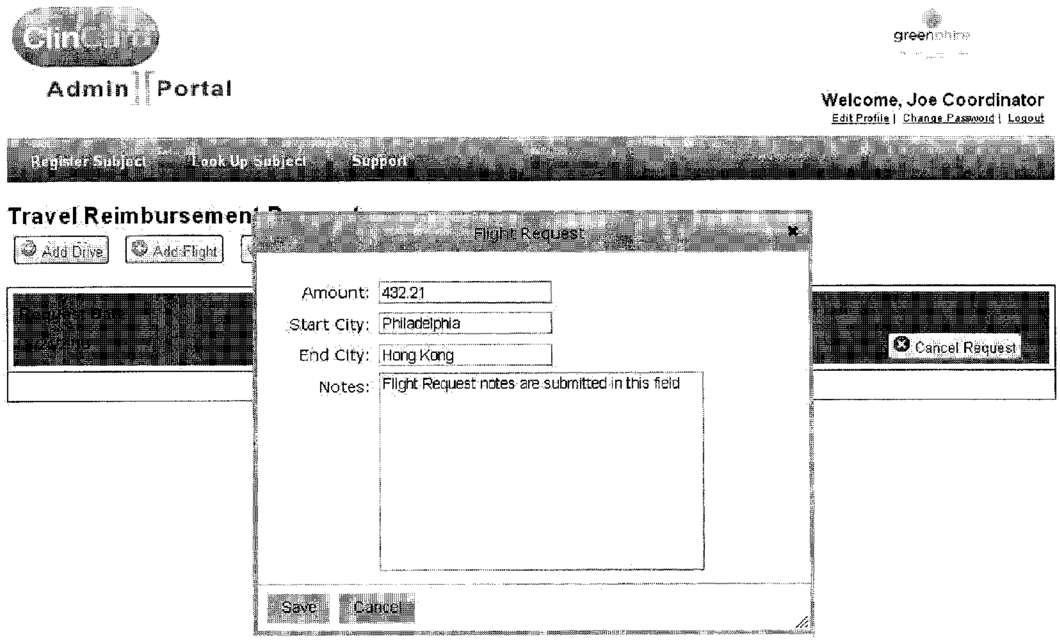

1.6.2 Travel Payment Screen—Flight Request (FIG. 18)

When a user clicks on Add Flight from the Travel Payment Screen a pop up box "Flight Request" appears. This pop up box allows the user to enter payment information and travel detail associated with an individual subject's flight expense. This detail is then either stored in the ClinCard System for reporting purposes to the client or funneled into the ClinCard approval system where it is then reviewed and either approved or declined by the client.

Figure 19:
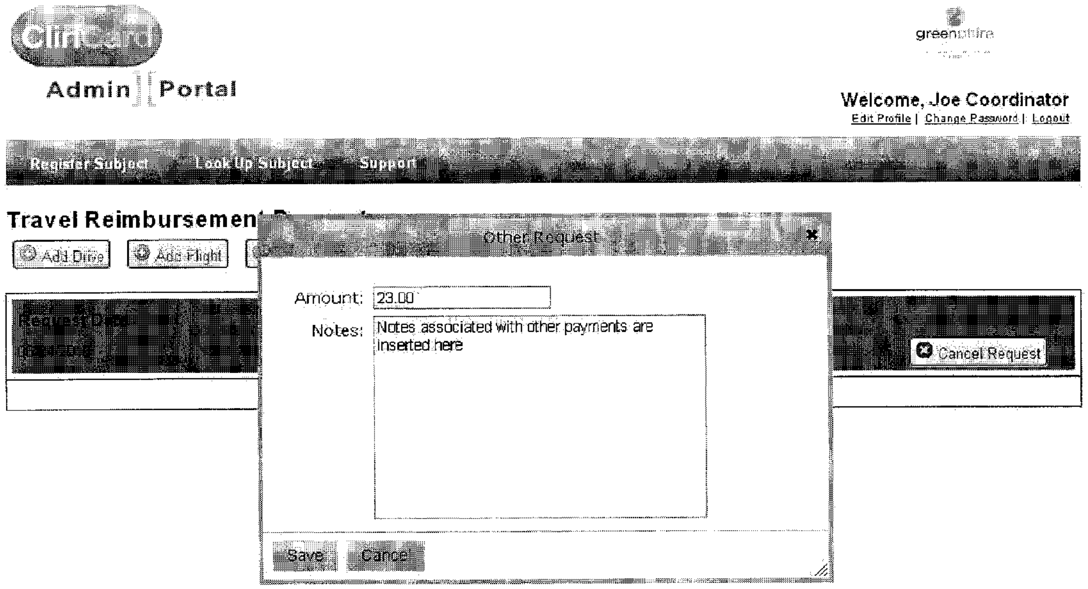

1.6.3 Travel Payment Screen—Other Request (FIG. 19)

When a user clicks on Add Other on the Travel Payment Screen a pop up box "Other Request" appears that allows the user to enter payment and note details regarding a one-off or unexpected travel reimbursement. Once submitted, the data is either stored for the client to reference in blinded reports or may be funneled into the ClinCard approval system for review and approval by a designated approver at the client level. Once approved, payments are executed.

Figure 20:
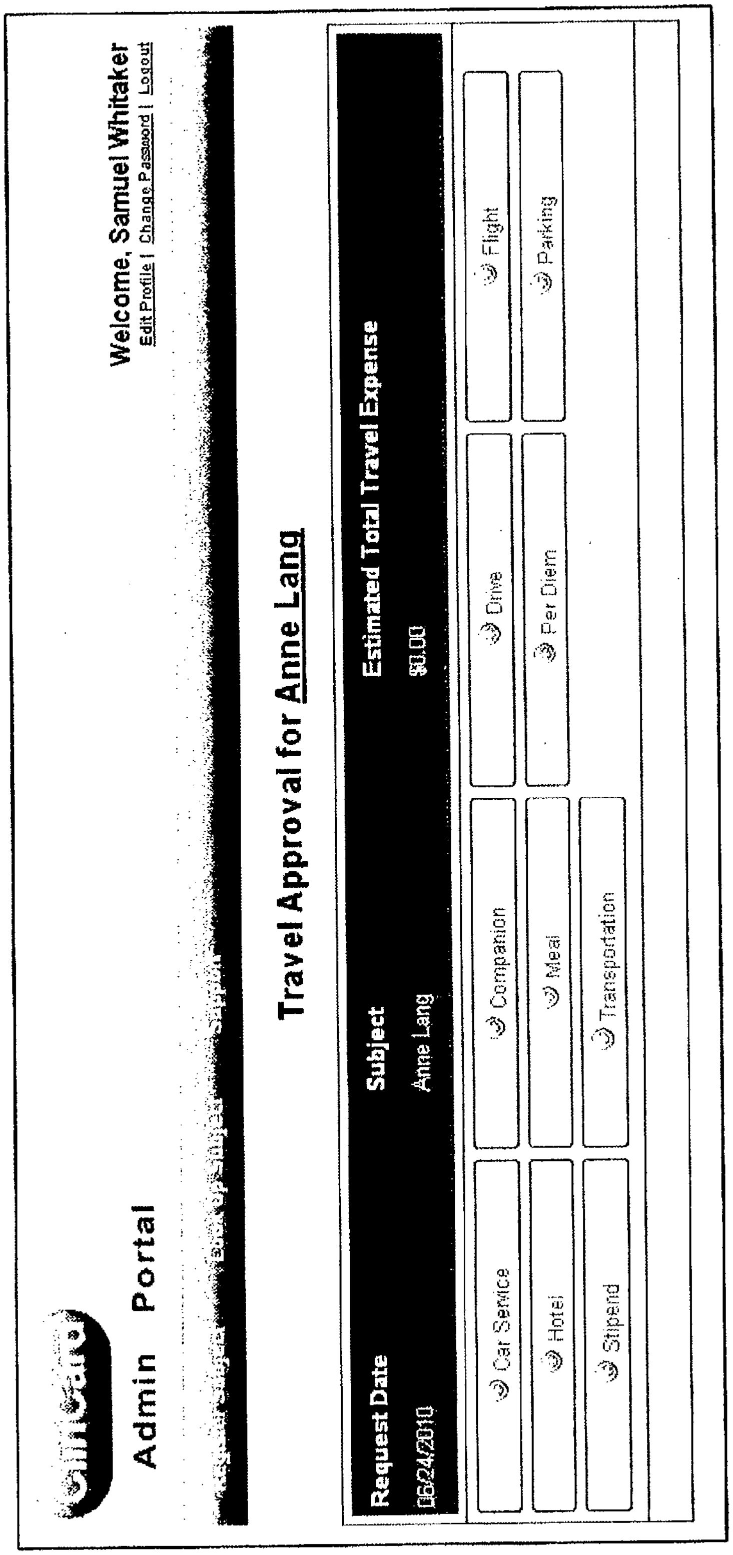

1.7 Request Travel Approval Screen (FIG. 20)

When a user clicks on the Request Travel Approval button on the Subject Information screen, the user is brought to the Request Travel Approval Screen. From this page, the user has the ability to request one or more types of travel for any individual subject. Once an individual request is made, details concerning the request including travel method, payment amount, date of request and requestor is funneled into the travel approval system blinding subject data whereby the client is then able to review requests and either approve or decline and individual request. Each option that is made available to the user is tied to the individual study in which a subject has been associated during the registration process. A single study can be configured so that any combination of travel request buttons may appear for a specific subject when the user navigates to the Request Travel Approval screen.

Some line items once approved load a specific dollar amount into the Make Site Visit Payment button that is located on the Subject Information Screen while others may drive the delivery of an automated email to a designated travel agent contact that is then triggered to make travel arrangements for the individual subject. When requests are reviewed in the approval portal, subject information is blinded but data is then unblinded when communicated to the designated travel agent.

Figure 21:
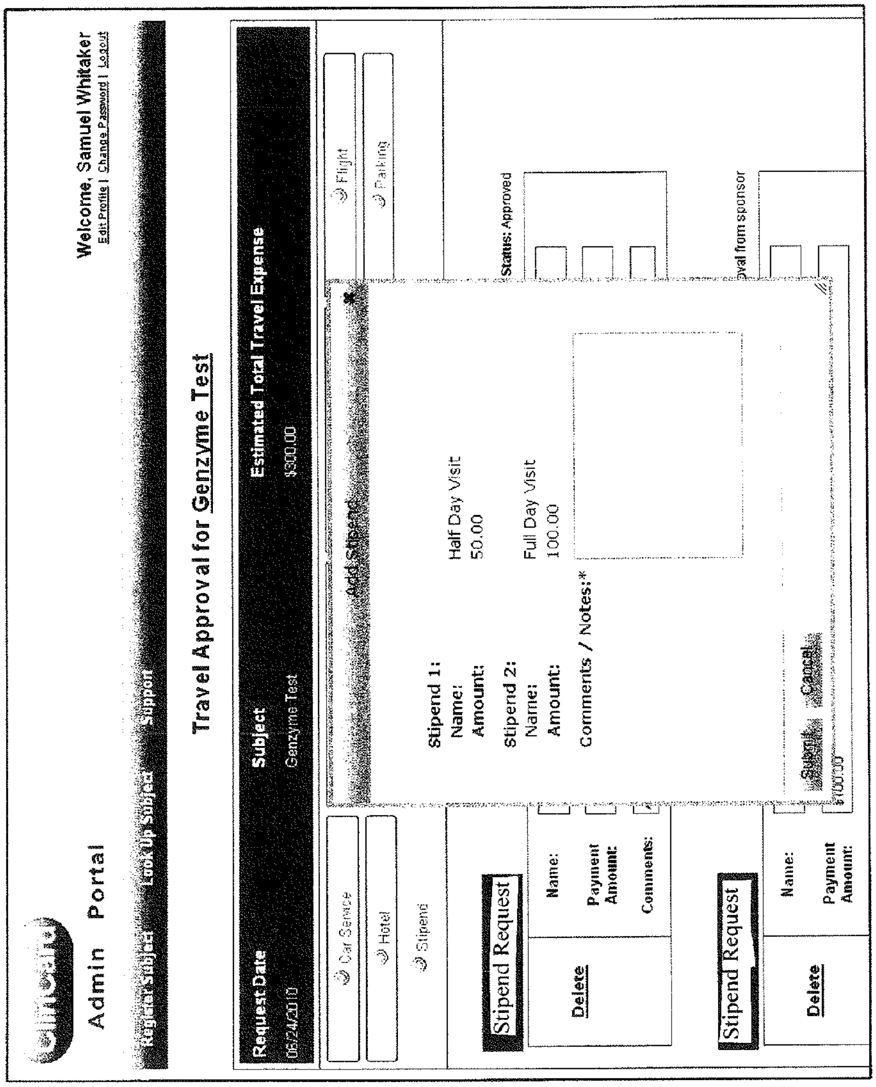

1.7.1 Request Travel Approval Screen—Add Stipend (FIG. 21)

When the user clicks on Add Stipend on the Request Travel Approval Screen, the user must enter required data in order to submit a request that the individual subject receive a stipend payment for each visit attended. The Stipend structure is pre-configured in the ClinCard system but a certain dollar value may also be requested via the Add Stipend pop up box. Once approved, the appropriate dollar values are loaded into the Make Site Visit Payment button on the Subject Information Screen.

Figure 22:
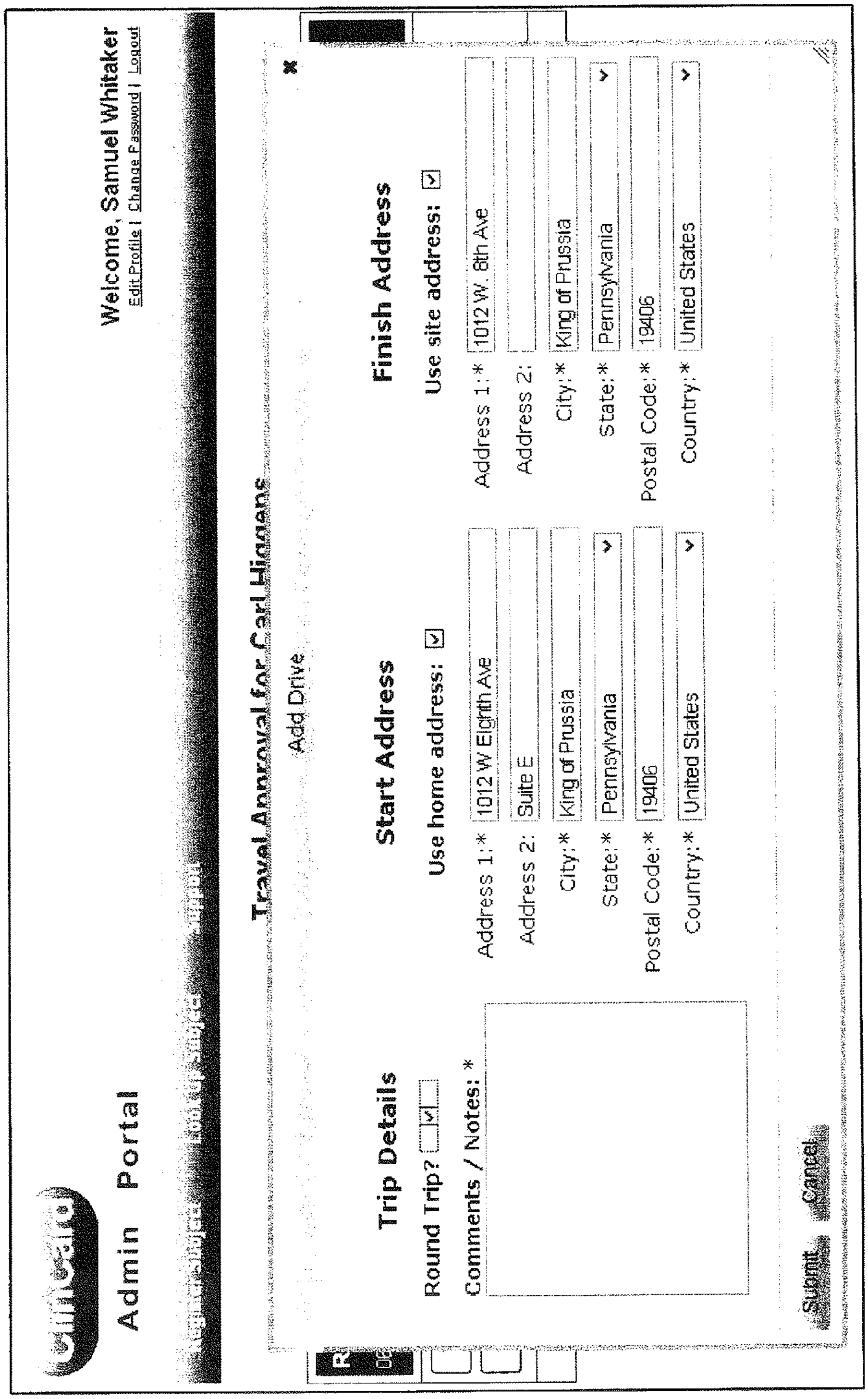

1.7.2 Request Travel Approval Screen—Add Drive (FIG. 22)

When a user clicks Add Drive on the Request Travel Approval Screen, the user is requesting that mileage reimbursement payments be made to the individual subject. The Add Drive pop up screen pre-populates the subject's home address as the starting address and the research site's location as the finish address. The user is also required to designate if the subject will be traveling "round trip" and submit any relevant comments related to the request. Once submitted, the ClinCard system automatically calculates the driving mileage and calculates the appropriate reimbursement amount based on payment logic that is configured in the ClinCard System per the client's requirements.

Figure 23:
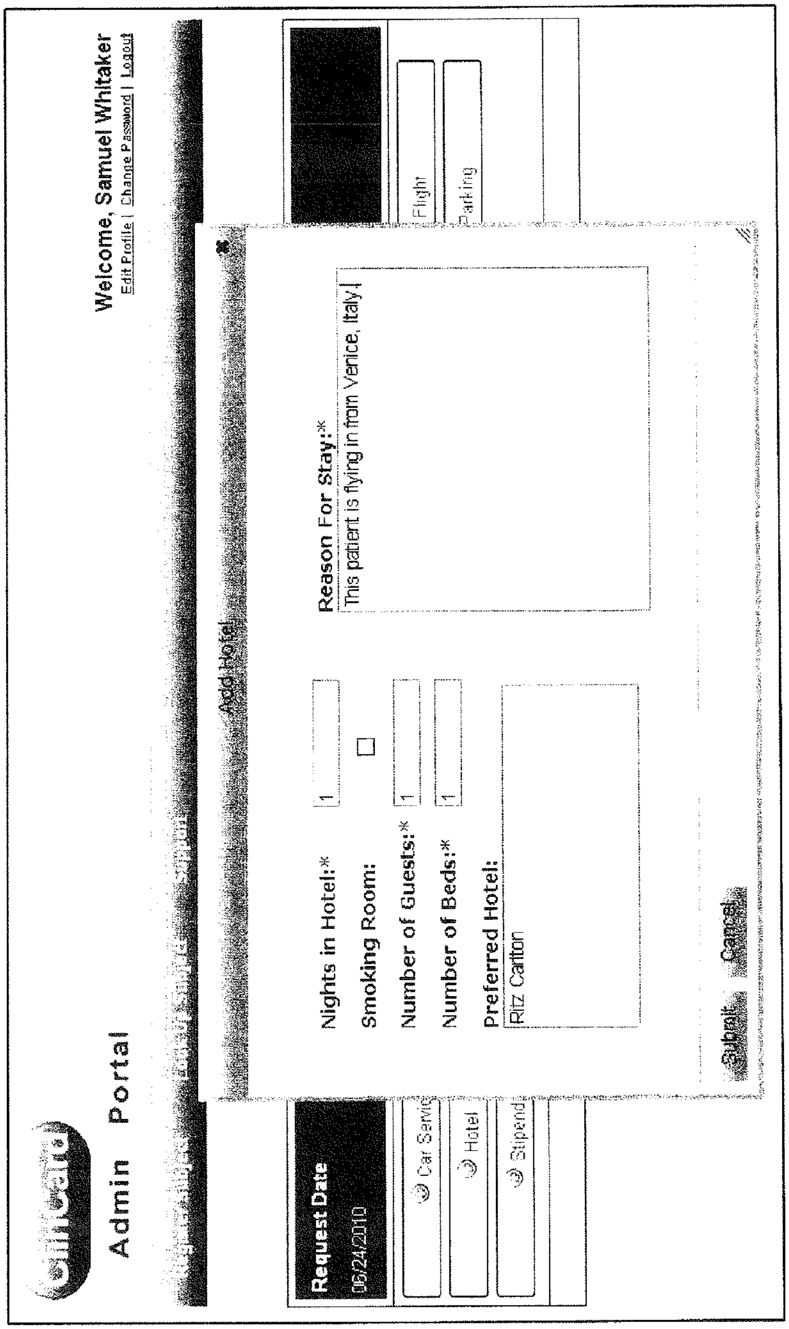

1.7.3 Request Travel Approval Screen—Add Hotel (FIG. 23)

When the user clicks on Add Hotel from the Request Travel Approval Screen, the user will see a pop up box that allows the user to input data associated with a hotel stay for the individual subject. This information is then relayed to the client for approval and once approved, is provided in unblended format to the designated travel agent in order to allow for arrangements to be made for the subject.

Figure 24:
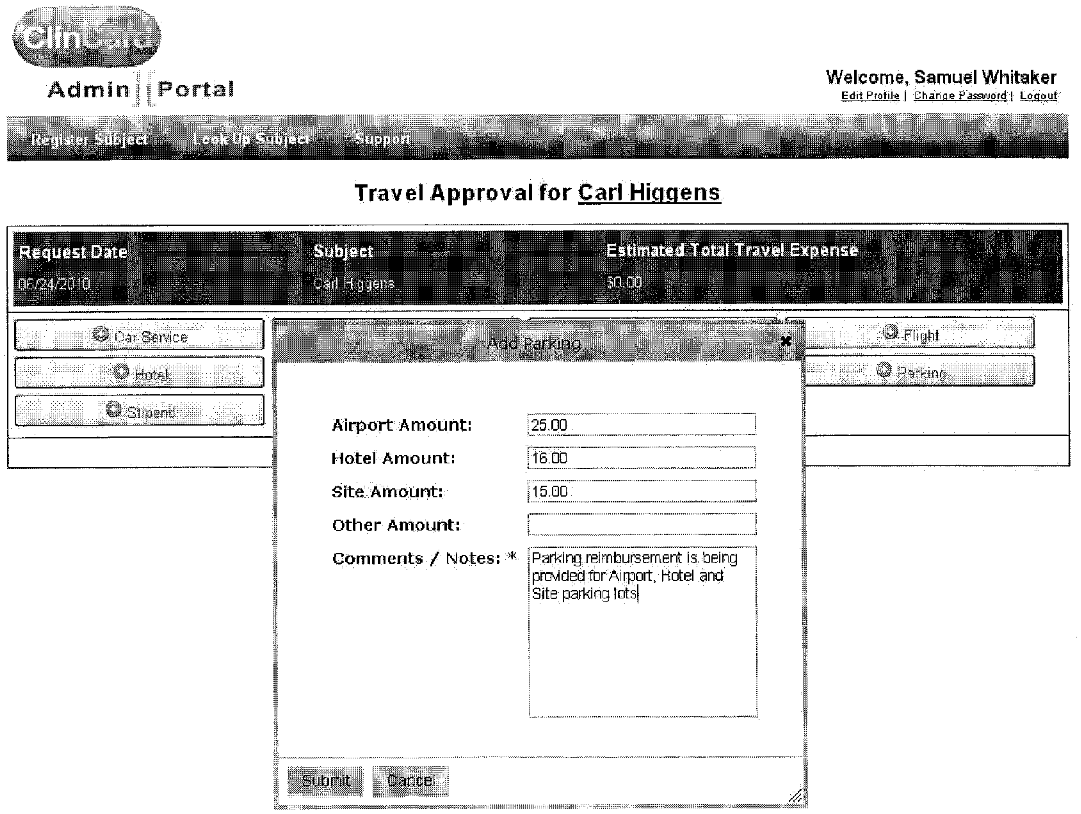

1.7.4 Request Travel Approval Screen—Add Parking (FIG. 24)

When the user clicks on Add Parking on the Request Travel Approval Screen, the user will see a pop up box that allows the user to enter information and dollar values associated with various types of parking expense. Once submitted, this information is funneled into the approval portal for the client to review/approve. Once approved, the system will load the appropriate dollar values into the Make Site Visit Payment button located on the Subject Information Screen so that a user at the research site can execute a subject payment and the value can be loaded onto the subject's ClinCard.

Figure 25:
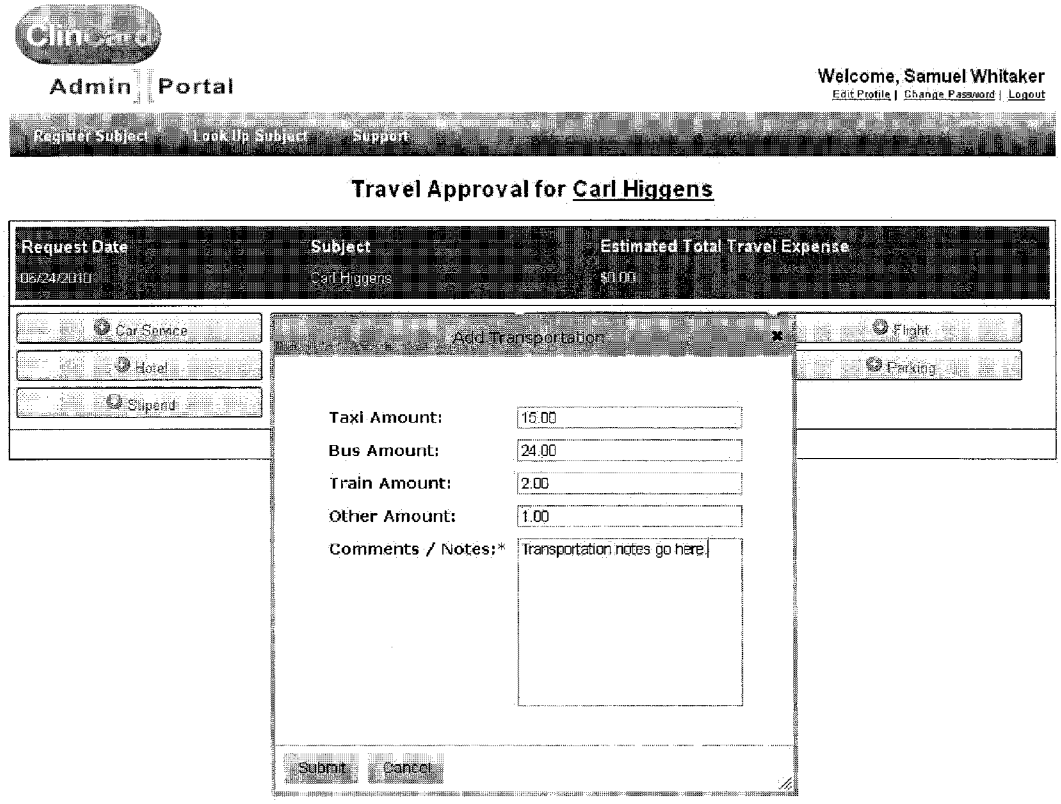

1.7.5 Request Travel Approval Screen—Add Transportation (FIG. 25)

When the user clicks on Add Transportation on the Request Travel Approval Screen, the user will see a pop up box that allows the user to enter information and dollar values associated with various types of transportation expense. Once submitted this information is funneled into the approval portal for the client to review/approve. Once approved, the system will load the appropriate dollar values into the Make Site Visit Payment button located on the Subject Information Screen so that a user at the research site can execute a subject payment and the value can be loaded onto the subject's ClinCard.

Figure 26:
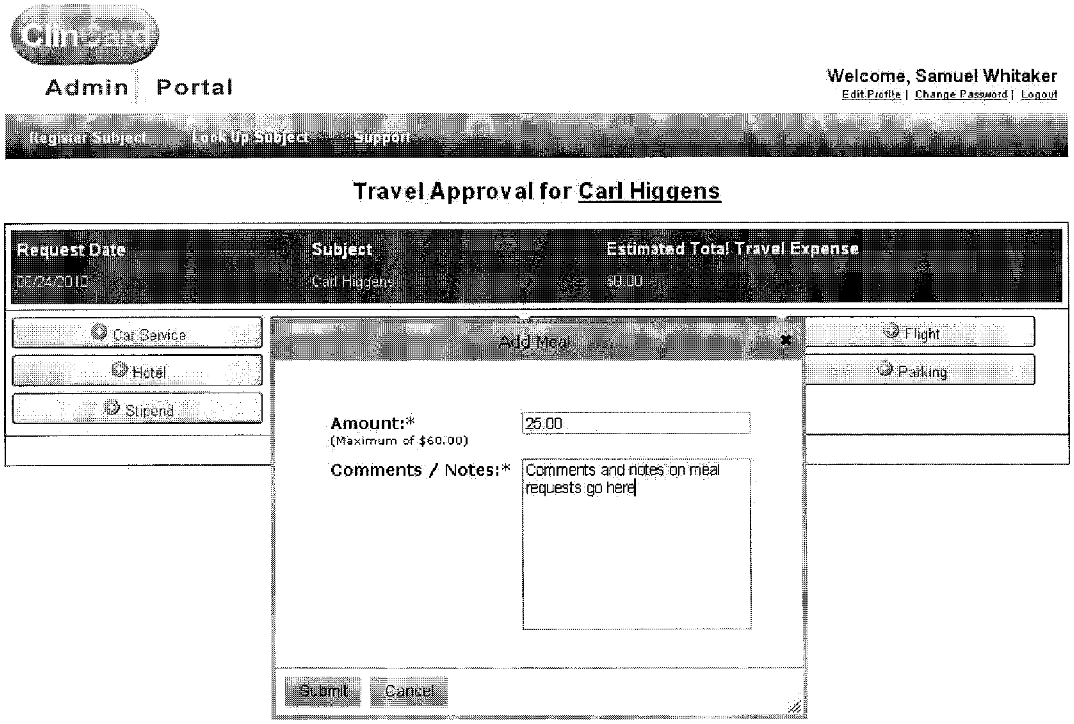

1.7.6 Request Travel Approval Screen—Add Meal (FIG. 26)

When the user clicks on Add Meal on the Request Travel Approval Screen, the user will see a pop up box that allows the user to enter information and dollar values associated with various types of parking expense. Once submitted, this information is funneled into the approval portal for the client to review/approve. Once approved, the system will load the appropriate dollar values into the Make Site Visit Payment button located on the Subject Information Screen so that a user at the research site can execute a subject payment and the value can be loaded onto the subject's ClinCard.

Figure 27:
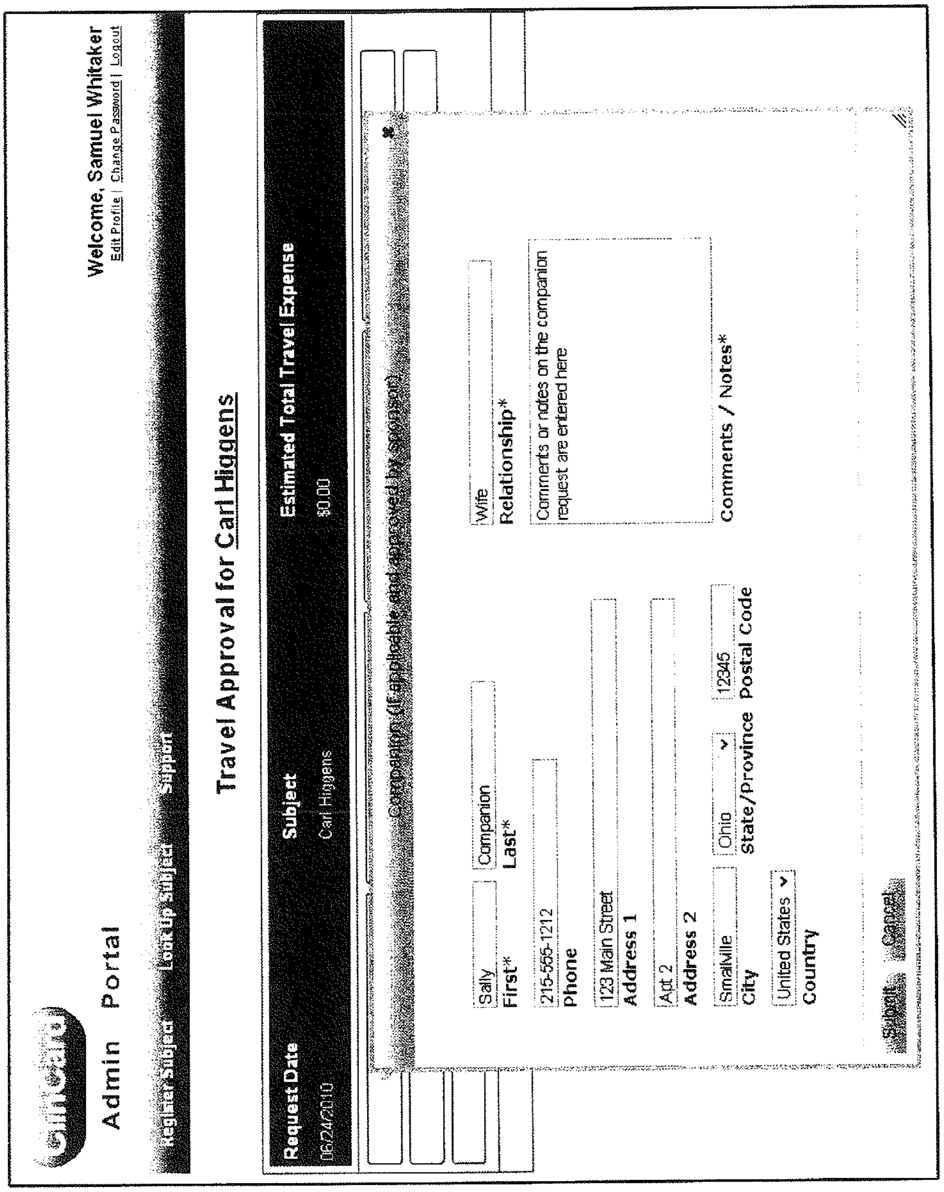

1.7.7 Request Travel Approval Screen—Add Companion (FIG. 27)

When the user clicks on Add Companion on the Request Travel Approval Screen, the user will see a pop up box that allows the user to enter information associated with a subject's travel companion. Once submitted, this information is funneled into the approval portal for the client to review/approve. Once approved, the system will load the appropriate dollar values that may be associated with the approval of a travel companion into the Make Site Visit Payment button located on the Subject Information Screen so that a user at the research site can execute a subject payment and the value can be loaded onto the subject's ClinCard. This information will also be used by the client's designated travel agent to make travel arrangements for a subject's travel companion.

1.7.8 Request Travel Approval Screen—Add Car Service (FIG. 28)

When a user clicks Add Car Service on the Request Travel Approval Screen, the user is requesting that travel arrangements via a taxi or limousine service be made for the individual subject. The Add Car Service pop up screen pre-populates the subject's home address as the starting address and the research site's location as the finish address in order to communicate required data to the client's designated travel agent. Once submitted, this information is funneled to the approval portal for review and approval by the client. Once approved, subject data is unblinded and transferred to the client's designated travel agent so that arrangements may be made.

Figure 29:
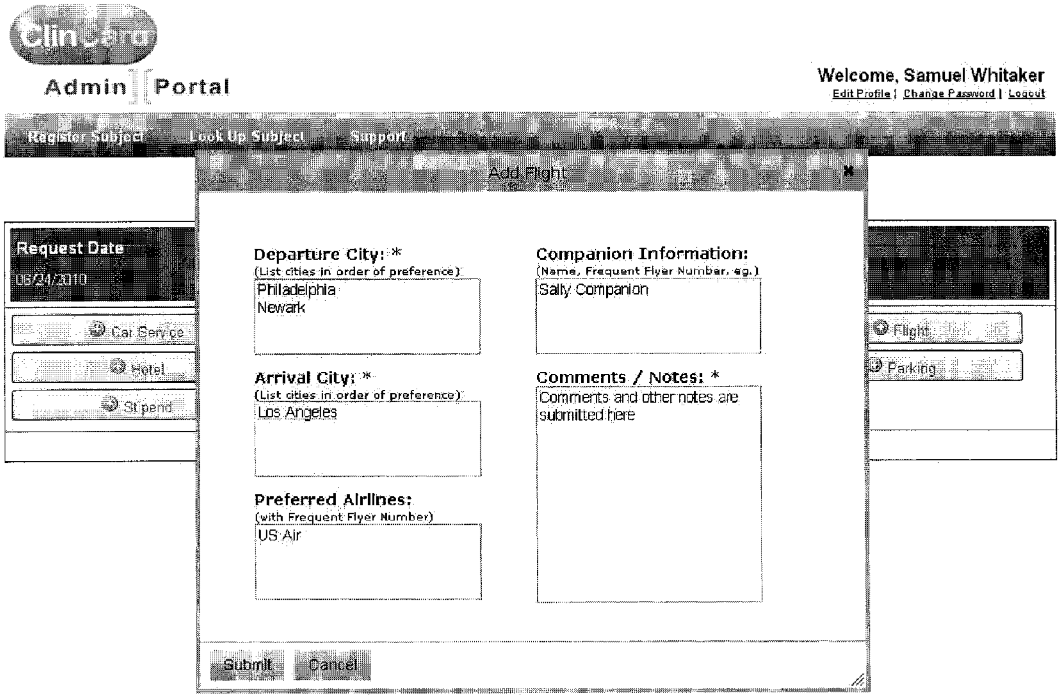

1.7.9 Request Travel Approval Screen—Add Flight (FIG. 29)

When the user clicks on Add Flight on the Request Travel Approval Screen, the user will see a pop up box that allows the user to enter information associated with flight arrangements that must be made for the individual subject. Once submitted, this information is funneled into the approval portal for the client to review/approve. Once approved, the system will transfer unblinded subject and companion information to the client's designated travel agent.

1.7.10 Request Travel Approval Screen—Add Other (not Shown)

Add Other is any other required line item that may be added to the Travel Approval Screen per the specific study requirements of a ClinCard program as requested by the client during the ClinCard system implementation period.

Figure 30:
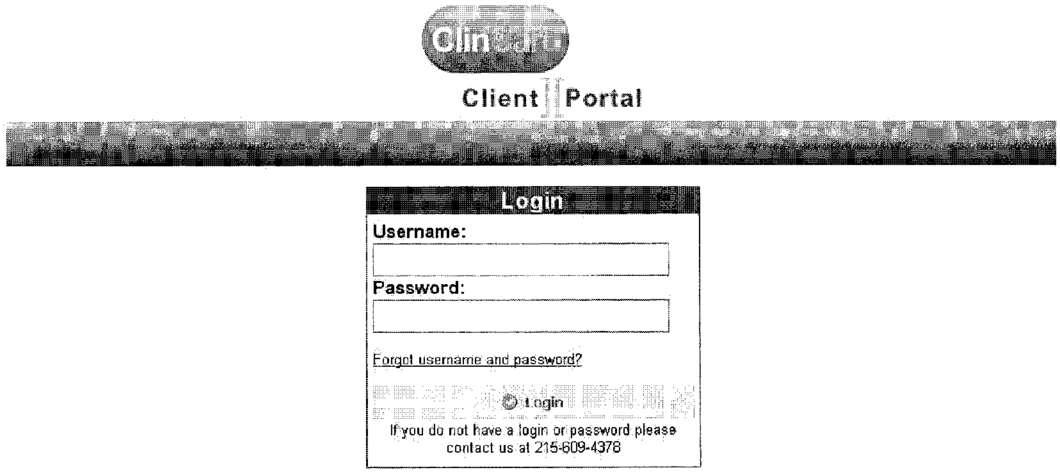

2.0 clinclient.com Login Screen (FIG. 30)

The clinclient.com login screen allows the user the ability to enter a username and password that is provided by the ClinCard System. This allows a designated user to login and review blinded payment records, travel request records, view reports and contact support. If a username or password is forgotten, the user may retrieve it either through a username and password retrieval process. Finally, the user is provided appropriate information enabling the user to contact support for help logging into the clinclient.com web portal.

2.1 Payment Approvals (No Figure)

When the user clicks on Payment Approvals, all subject payment requests that are submitted through the subject information screen on clincard.com are available to be viewed. All records are identified to the user using a unique subject ID as submitted through clincard.com that corresponds with the subject ID referenced in other study related systems and documents. If the user clicks on "show details," each payment record's detail is revealed. The user may then approve or decline one or more payment record. Once a payment record is approved, funds are immediately made available to the individual payment and are accessible via the subject's ClinCard.

Figure 31:
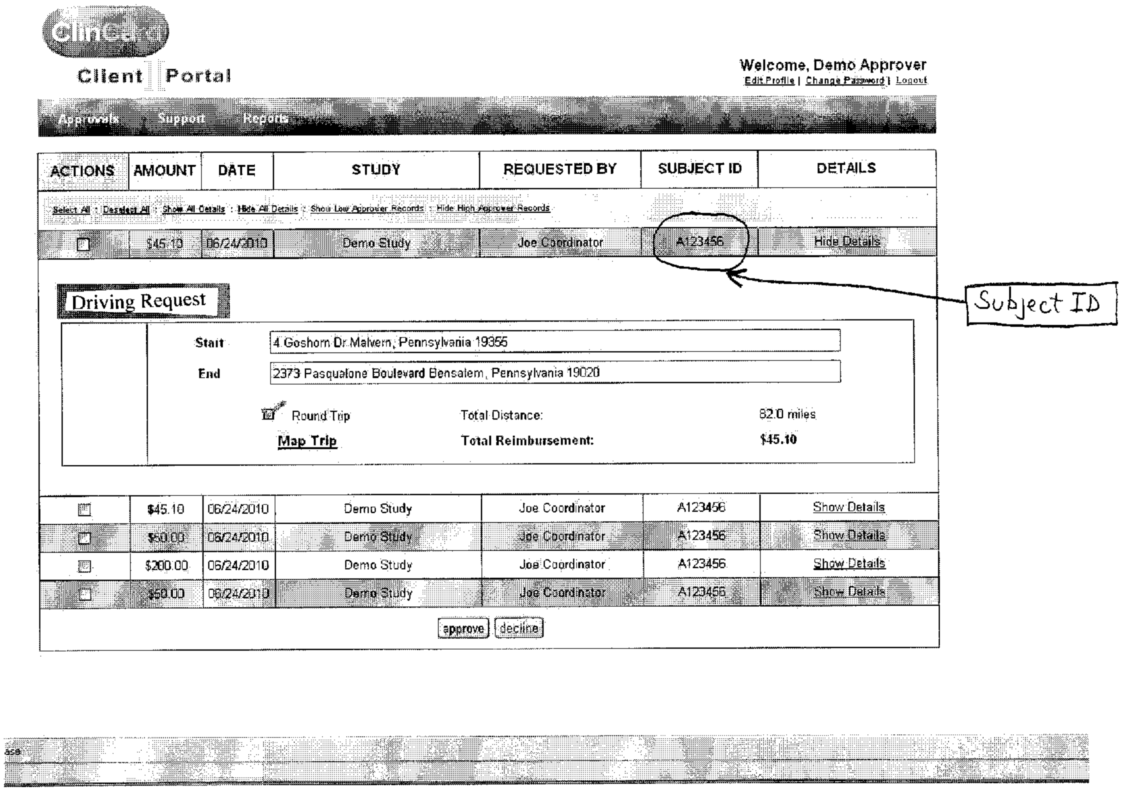

2.1.1 Blinded Payment Records (FIG. 31)

Each payment record communicates specific data to the approver including payment amount, date requested, study in which the subject is associated, and the individual subject ID. This allows the client to review all payment details without revealing the unique identity of the subject. This visibility allows the client the ability to ensure that subject payments are compliant from a regulatory perspective and are in line with proposed research site level budgets.

2.2 Travel Approvals (No Figure)

When the user clicks on Travel Approvals, all subject travel requests that are submitted through clincard.com are available to be viewed. All records are identified to the user using a unique subject ID as submitted through clincard.com that corresponds with the subject ID referenced in other study related systems and documents. Each individual travel request is made available for the approver to view. The user may then approve or decline one or more payment record and send a message back to the requester via the Approver Comment field. Once a travel request record is approved, a corresponding email is sent to the client's designated travel agent and any records that have a dollar value associated with them are made available to be paid through the subject information screen on clincard.com.

2.2.1 Blinded Travel Request Records (FIG. 32)

Making travel reimbursement requests available to the client electronically using subject IDs through an electronic system allows the client to control travel arrangements from the site level without risking unblinding the study by revealing subject data.

2.3 ClinClient Reports (No Figure)

When a user clicks on Reports, the user is able to view a suite of standard and custom reports that may have been put in place specifically for an individual study. All reports are also able to be exported in the Microsoft Excel format and may also be emailed to a designated "report recipients" on a subscription basis.

2.3.1 Blinded Reports (FIG. 33)

Making payment reports available to the client electronically using subject IDs through an electronic system allows the client to create and work with a detailed audit trail associated with subject payments across all research site locations for an individual study. This allows the client to ensure that subject payments are made in line with regulatory guidelines and approved budgets (predefined compensation guidelines).

Figure 34:
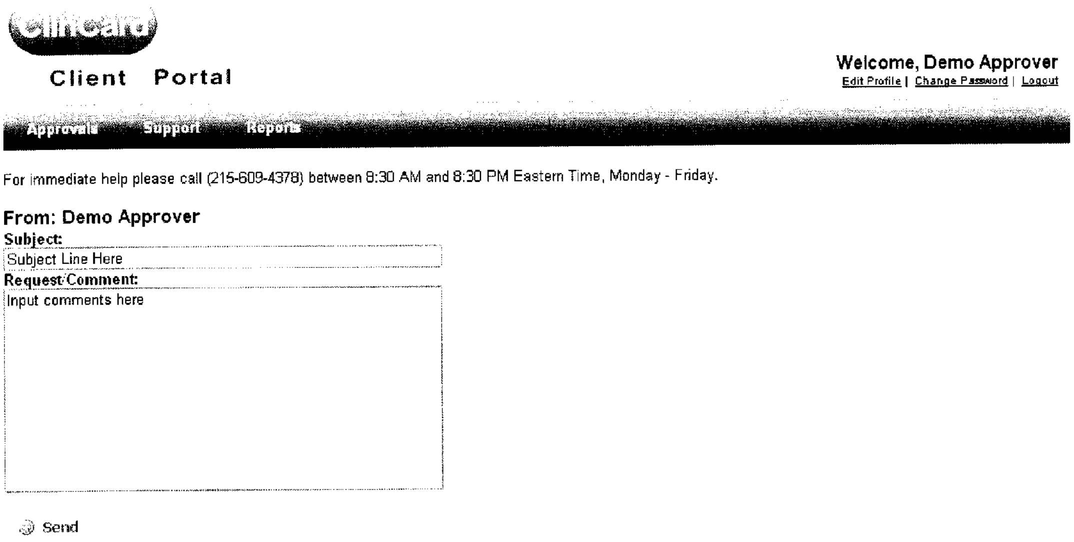

2.4 ClinClient Support (FIG. 34)

If a user clicks on Support, the user is then able to reach client support via an email form or through study specific contact information that is posted to this page within the clinclient.com web portal.

C. Hardware Configuration

Figure 35:
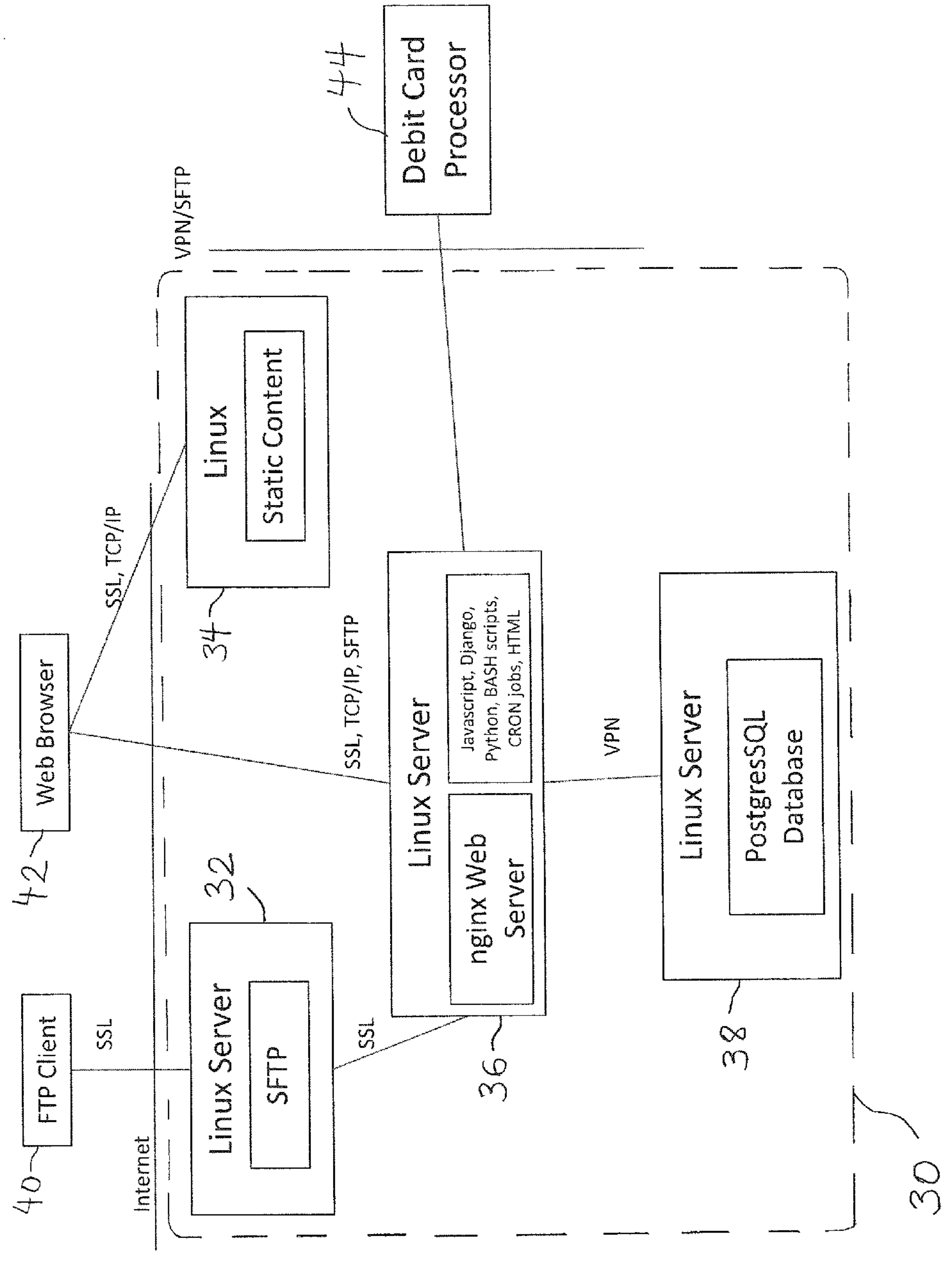
FIG. 35 is a hardware configuration in accordance with preferred embodiments of the present invention.
Figure 36G:
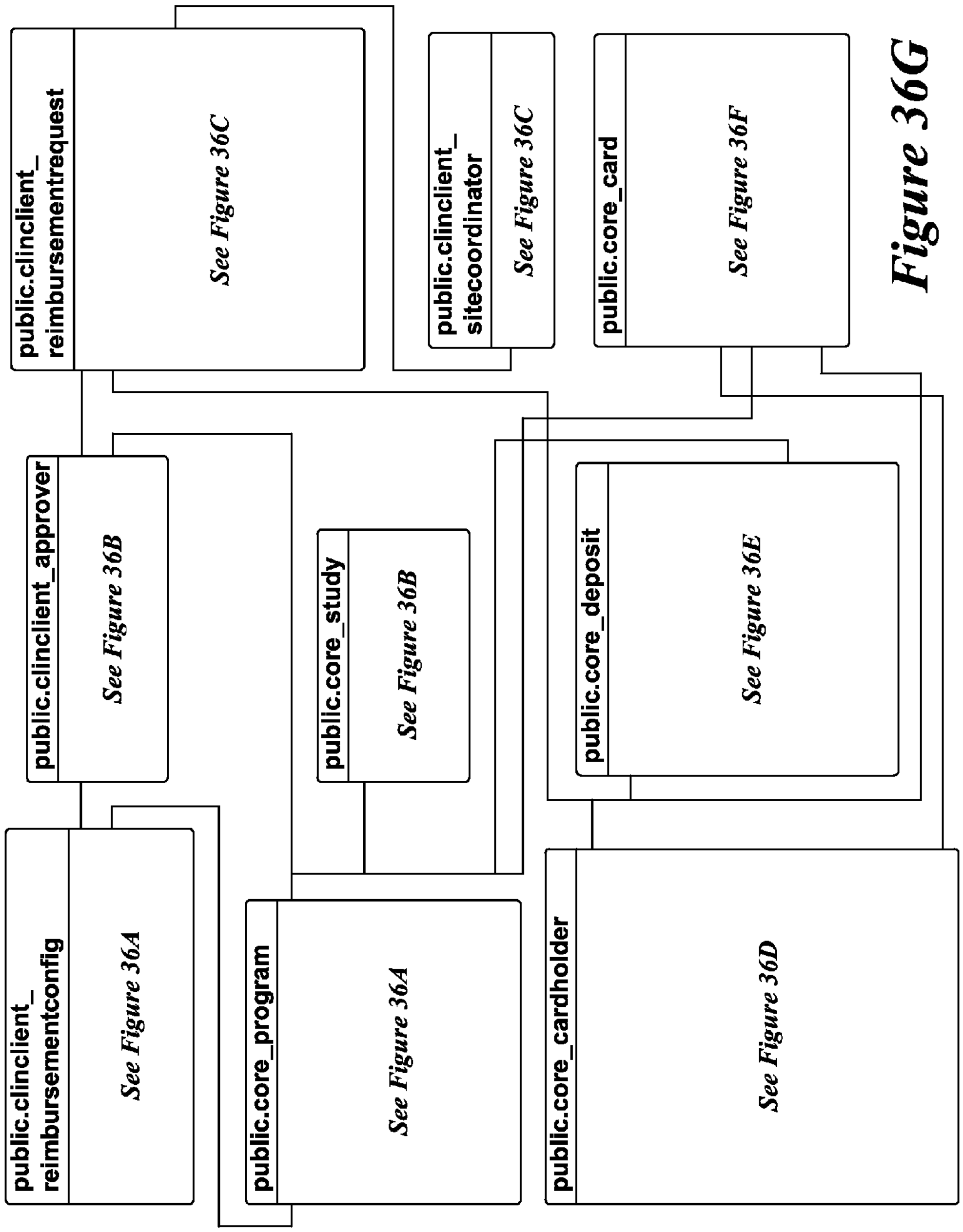

FIG. 35 shows one preferred hardware configuration of the present invention. The ClinCard system 30 includes a server 32 that provides secure FTP, a server 34 that provides static content, a server 36 that provides web-based functions, and a server 38 that manages one or more databases for the data associated with the ClinCard system 30. One preferred database schema is shown in FIGS. 36A-36G which is self-explanatory. Access to the ClinCard system 30 occurs over an electronic network (e.g., the Internet) via an FTP client 40 or a web browser 42. A debit card processor 44 accesses the server 36 via the electronic network. Each of the servers include one or more processors for handling all page requests and application processing, including executing software (software application(s)) running therein. The one or more processors may be part of one or multiple general-purpose computers.

The ClinCard system 30 shown in FIG. 35 uses primarily open source and free software. However, other hardware configurations that use equivalent closed source (proprietary software) for some or all of the software elements are within the scope of the present invention.

In FIGS. 36A-36G, the symbols have the following meaning:

| Symbol | Definition |
|---|---|
| P | Primary Key |
| F | Foreign Key |
| N | Not Null |
| D | Default Value Set |

In FIGS. 36A-36G, the patient ID or subject ID is denoted as "id." The "subject ID information" or "patient ID information" includes information such as "first_name," "last_name," "email," "cell_phone," "home_phone," "dob," and "address_id."

In the preferred embodiments described above, payments are made directly to patients. In an alternative embodiment, payment made to a patient may also include indirect forms of payment such as direct payments to travel vendors for travel services required by the patient activity. Such payment may be processed in a similar manner as debit card payments. For example, the Clincard software application authorizes payment to travel vendors for the travel services required by a specific patient using patient ID information. However, the blinded payment reports and the queued payment requests (if sponsor approval is required) do not include the patient ID information but instead uses the subject ID so as to maintain the blinding.

In one preferred embodiment, the electronic review and approval of queued payment requests is performed by the sponsor/client. In another preferred embodiment, the sponsor/client may authorize a third party entity, such as an authorized user of the Clincard software application, to perform the electronic review and approval in accordance with the predefined compensation guidelines for the clinical study.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer readable media. The media is encoded with computer readable program code for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. An automated method of reporting payments made to patients for their participation in a clinical study in a blinded manner to the sponsor of the clinical study, the clinical study having a plurality of investigative sites which perform activities in accordance with the protocol of the clinical study, each patient having patient ID information and being assigned a subject ID that de-identifies the patient, the method comprising:

(a) receiving payment requests at a software application executing on one or more computer processors from the investigative sites associated with patient activity, the software application executing on the one or more computer processors including for each patient that is participating in the clinical study, the patient ID information, and the de-identified subject ID, the payment requests being associated with the patient ID information, the payment requests being requests to make payments to patients for their participation in the clinical study, and wherein approved payment requests are reported on blinded payment reports;

(b) processing the payment requests at the software application executing on the one or more computer processors, and approving payments that conform to activities performed in accordance with the protocol of the clinical study and in line with regulatory guidelines and approved budgets for the clinical study, the approved payments being payments made to patients for their participation in the clinical study; and (c) generating by the software application executing on the one or more computer processors the blinded payment reports for electronic delivery to the sponsor, each blinded payment report showing at least:

(i) the de-identified subject ID for each approved payment, (ii) the payment amounts for each approved payment, and (iii) date associated with each approved payment, each blinded payment report including approved payments made for a plurality of de-identified subject ID's, wherein the approved payments are payments made to patients for their participation in the clinical study.

2. The method of claim 1 wherein the participation includes at least one of patient screening, or patient enrollment.

3. The method of claim 1 wherein the participation includes consumption or use of an investigational product associated with the clinical study.

4. The method of claim 1 wherein the date associated with the payment is the date of patient activity, or the date of the payment request, or the date of the payment approval.

5. The method of claim 1 wherein selected patients are assigned to their own respective debit cards, each debit card having a balance, wherein step (b) further comprises updating the balance of the debit cards by the software application executing on the one or more computer processors for the approved payments.

6. The method of claim 1 wherein step (b) further comprises queuing payment requests via the software application for electronic review by the sponsor, and approving payments via electronic authorization by the sponsor.

7. A computer program product for reporting payments made to patients for their participation in a clinical study in a blinded manner to the sponsor of the clinical study, the clinical study having a plurality of investigative sites which perform activities in accordance with the protocol of the clinical study, each patient having patient ID information and being assigned a subject ID that de-identifies the patient, the computer program product comprising a non-transitory computer-readable media encoded with instructions for execution by one or more computer processors to perform a method comprising:

(a) receiving payment requests at a software application executing on the one or more computer processors from the investigative sites associated with patient activity, the software application executing on the one or more processors including for each patient that is participating in the clinical study, the patient ID information, and the de-identified subject ID, the payment requests being associated with the patient ID information, the payment requests being requests to make payments to patients for their participation in the clinical study, and wherein approved payment requests are reported on blinded payment reports;

(b) processing the payment requests at the software application executing on the one or more computer processors, and approving payments that conform to activities performed in accordance with the protocol of the clinical study and in line with regulatory guidelines and approved budgets for the clinical study, the approved payments being payments made to patients for their participation in the clinical study; and (c) generating by the software application executing on the one or more computer processors the blinded payment reports for electronic delivery to the sponsor, each blinded payment report showing at least:

(i) the de-identified subject ID for each approved payment, (ii) the payment amounts for each approved payment, and (iii) date associated with each approved payment, each blinded payment report including approved payments made for a plurality of de-identified subject ID's, wherein the approved payments are payments made to patients for their participation in the clinical study.

8. The computer program product of claim 7 wherein the participation includes at least one of patient screening, or patient enrollment.

9. The computer program product of claim 7 wherein the participation includes consumption or use of an investigational product associated with the clinical study.

10. The computer program product of claim 7 wherein the date associated with the payment is the date of patient activity, or the date of the payment request, or the date of the payment approval.

11. The computer program product of claim 7 wherein selected patients are assigned to their own respective debit cards, each debit card having a balance, wherein step (b) further comprises updating the balance of the debit cards by the software application executing on the one or more computer processors for the approved payments.

12. The computer program product of claim 7 wherein step (b) further comprises queuing payment requests via the software application for electronic review by the sponsor, and approving payments via electronic authorization by the sponsor.

* * * * *